United States Patent
Swaminathan

(10) Patent No.: US 12,002,023 B2
(45) Date of Patent: Jun. 4, 2024

(54) CASH REGISTER AND TICKET VENDING WITH MINIMAL INFRASTRUCTURE

(71) Applicant: Kishore Swaminathan, Willowbrook, IL (US)

(72) Inventor: Kishore Swaminathan, Willowbrook, IL (US)

(*) Notice: Subject to any disclaimer, the term of this patent is extended or adjusted under 35 U.S.C. 154(b) by 0 days.

(21) Appl. No.: 18/115,107

(22) Filed: Feb. 28, 2023

(65) Prior Publication Data

US 2023/0214802 A1    Jul. 6, 2023

Related U.S. Application Data

(63) Continuation of application No. 17/410,401, filed on Aug. 24, 2021, now Pat. No. 11,620,622, which is a continuation of application No. 17/129,141, filed on Dec. 21, 2020, now Pat. No. 11,132,655.

(60) Provisional application No. 62/950,361, filed on Dec. 19, 2019.

(51) Int. Cl.
| | |
|---|---|
| *G06Q 20/10* | (2012.01) |
| *G06Q 20/02* | (2012.01) |
| *G06Q 20/18* | (2012.01) |
| *G06Q 20/20* | (2012.01) |
| *G06Q 20/32* | (2012.01) |
| *G06Q 20/38* | (2012.01) |
| *G06Q 30/0601* | (2023.01) |
| *G07F 9/00* | (2006.01) |
| *H04W 12/40* | (2021.01) |
| *G06K 7/14* | (2006.01) |

(52) U.S. Cl.
CPC ......... *G06Q 20/102* (2013.01); *G06Q 20/027* (2013.01); *G06Q 20/18* (2013.01); *G06Q 20/202* (2013.01); *G06Q 20/3226* (2013.01); *G06Q 20/3821* (2013.01); *G06Q 20/3825* (2013.01); *G06Q 30/0633* (2013.01); *G07F 9/001* (2020.05); *G07F 9/002* (2020.05); *H04W 12/40* (2021.01); *G06K 7/1417* (2013.01); *G06Q 20/326* (2020.05); *G06Q 20/3276* (2013.01)

(58) Field of Classification Search
None
See application file for complete search history.

(56) References Cited

U.S. PATENT DOCUMENTS

| | | | |
|---|---|---|---|
| 11,120,430 B2* | 9/2021 | Metral | G06Q 20/3278 |
| 2006/0271497 A1* | 11/2006 | Cullen | G06Q 20/12 |
| | | | 705/64 |

* cited by examiner

*Primary Examiner* — Joseph W. King

(57) ABSTRACT

Described herein are a cash register and a ticket vending mechanism that require little or no merchant infrastructure resulting in dramatic cost reduction for merchants. These are made possible through a payer-centric payment paradigm where the payer—as opposed to the merchant—completes the payment transaction without depending on the merchant, resulting in increased payer convenience and payment security.

14 Claims, 26 Drawing Sheets

Merchant Profile

Merchant Name: Topaz Café

What do you sell?
- ● Products/Services
- ○ Tickets for events
- ○ Virtual products (downloadable)

Your logo: TOPAZ CAFÉ  
upload file    delete

Types of payments you want to accept:
- ● Physical (brick & mortar)
- ○ Online
- ○ Both

Tips:
- ● Add tips to payments
- ○ Does not apply

Shipping:
- ● Payer must provide shipping info
- ○ Does not apply

Reviews:
- ● Does not apply
- ○ Prompt users to post reviews

Feedback:
- ○ Does not apply
- ● Prompt payers for feedback upload prompt text

Promotions:
- ○ Prompt payers to fill survey upload survey
- ☐ Prompt payers for email ID
- ☑ Prompt payers to accept coupons

Fig. 10

Create Payment Request

Franks Store

Customer ID: angela@elfpoint.com

Amount: $ 29.95

Expiration Date _____ optional

Invoice Upload: choose file

CANCEL    CREATE REQUEST

— 1402

```
[
  "header": {
    "type": "request",
    "request_id": 1137745653,
    "merchant_id": "Franks Store",
    "customer_id": "angela@elfpoint.com",
    "amount": 29.95,
    "currency": "usd",
    "timestamp": 1576502422,
    "status": "active",
    "add_tips": false,
    "tax_deductability": false,
    "fulfillment_count": 1,
  }
  "body": {}
]
```

```
[
    "header": {
        "type": "transaction",
        "transaction_id": 1127745653,
        "request_id": 1137745653,
        "merchant_id": "Franks Store",
        "customer_id": "angela@elfpoint.com",
        "transaction_amount": 29.95,
        "currency": "usd",
        "timestamp": 1575638528,
        "confirmation_id": C454536788,
        "recurring": false,
        "commission": 1.21
    },
    "body": {},
    "tracker": {
        "gateway": "Stripe",
        "payment_source": "CCC4657879",
        "nickname": "Visa ****4242"
    }
]
```

— 1504

You have received a payment invoice from Franks Store

Invoice

Franks Store

Date For Amount

12/06/19  angela@elfpoint.com  $29.95

Invoice ID: 1137745653

Your Payment

Invoice  1137745653

Amount $  29.95

● Visa **** 4242
○ Mastercard **** 8210 or enter new card

PAY

Left screen (2102)

You scanned an invoice from Topaz Café

Invoice

Topaz Café

Date
12/03/19

Invoice ID: 3748130364

Your Payment

| | | Amount |
|---|---|---|
| Billed | $ | $45.40 |
| Tips | $ | 45.40 |
| Total | | 45.40 |

● Visa **** 4242
○ Mastercard **** 8210
or enter new card

[ PAY ]

Right screen (2104)

Topaz Café

Invoice ID: 3748130364
Date: 12/03/19
Check Amount: $45.40
Tips: $7.00
Total: $52.45

This invoice has been paid. Thank you!

Review Topaz Café on yelp

Accept coupons from Topaz Café?
● Yes
○ No

Paid with: Visa **** 4242

Fig. 21

CASH REGISTER AND TICKET VENDING WITH MINIMAL INFRASTRUCTURE

CROSS-REFERENCE TO RELATED APPLICATIONS

This document is a continuing application of U.S. patent application Ser. No. 17/410,401 titled "Federated Architecture for Electronic Payments Using a Payment Bus" which is a continuing application of Ser. No. 17/129,141 titled "System and Method for Payer-Centric Electronic Payments" which claims the benefit of US provisional patent application U.S. 62/950,361 titled "System and Method for Payer-Centric Electronic Payments." The foregoing applications are hereby incorporated by reference in their entirety.

FIELD OF INVENTION

This invention is in the field of electronic payments and describes systems and methods that enable vendors to receive electronic payments from customers.

BACKGROUND

Today's electronic payments embody what may be called a Merchant-Centric Payment (MCP) paradigm. In MCP, the payee or the merchant initiates, owns, and orchestrates the payment process: when the payer checks out, the merchant creates a transaction record in a cash register, ticket vending system (ticket vender), database etc., obtains the payer's payment credentials, and sends the payment amount and the credentials to a payment gateway such as Payment Tech or Stripe. The gateway obtains payment authorization from the financial institution that controls the customer's payment source and returns a confirmation code to the merchant. The merchant updates his or her transaction record and provides the customer a receipt. As such, in MCP, merchants or payees initiate, own, and orchestrate the entire payment process. FIG. 01 provides a high-level view of the MCP paradigm. Please note that contactless mobile payments are no exception to the MCP paradigm. Instead of presenting a payment source or credit card physically to a merchant, contactless payment technologies simply transmit the payment credentials wirelessly to the merchant. It is the merchant, not the mobile device, that orchestrates the payment process.

The MCP paradigm presents several problems and disadvantages for both customers and merchants. A well-recognized disadvantage is that, in the MCP paradigm, customers have to share their credentials with each merchant to whom they make a payment. An unscrupulous store clerk or a waiter can easily appropriate and abuse a customer's payment credential. More seriously, the IT systems that store the payment information can be broken into by cyber criminals from anywhere, leading to wholesale theft of thousands of payment credentials at once—an occurrence that's all too common.

MCP poses several problems for merchants as well.
Payment infrastructure such as card readers, PIN entry pads, contactless NFC readers etc. involves significant capital and ongoing operating costs for merchants.
Failure of the infrastructure is catastrophic for a merchant due to lost sales and revenue.
The MCP paradigm requires contact and/or proximity between the payer and the payee. With credit cards, the payer has to physically swipe a card into the payee's card reader. With contactless, the payer's card or mobile device must be within a few inches from the merchant—a constraint that is inconvenient for drive-in payments or when there is a need to avoid proximity (as during the Covid-19 pandemic).
For automated ticket vending machines that may be unattended or exposed to the elements, a full-fledged payment machinery with card readers and wide-area data connection can be expensive as they have to be rugged and tamper-proof.

In this document, we describe a Payer-Centric Payment (PCP) paradigm in contrast to MCP. The PCP paradigm is based, among other things, on a payment bus and a federated payment architecture that enables any vendor to request payment from any payer without requiring any specialized payment infrastructure and any payer to pay any vendor from their mobile device directly (i.e., without having to go through the vendor). This results in considerable cost savings for vendors, increased convenience for payers and overall payment security for everyone.

In this document, we describe a retail cash register and a ticket vending mechanism that require little or no infrastructure on the part of the vendor. The vendor infrastructure can be as simple as a piece of paper displaying a unique (static) ID of the vendor requesting a payment, or a simple screen displaying the unique (dynamic) ID of a payment request. Based on this ID, the payer completes a payment to the merchant directly (i.e., without any intervention from the merchant) and provides the merchant with a payment confirmation. This mode of payment is made possible, among other things, by a federated payment architecture and a payment bus that acts as a store-and-forward communication channel between payers and merchants.

BRIEF DESCRIPTION

FIG. 02 is meant to provide a high-level overview of our invention. Merchants place payment requests on an Internet-based payment bus that operates within an address space in which merchants, payers and payment records are all uniquely identified. The payment bus ferries the requests to the payers; alternatively, payers retrieve the payment request on demand from the payment bus. Payers pay for these requests in any way they please, from any device, at any time, through any payment gateway; then they place a confirmation of their payment transaction onto the same bus to be ferried back to the merchant. Since customers pay from their own devices, customers do not depend on the merchant to complete the payment. We refer to embodiments of our invention as Payer-Centric Payment Systems (PCPS).

Functionally, embodiments of this invention may enable customers to have a single payment system on their own devices from which they can pay any participating merchant—a physical store, a website, or a vending machine—without sharing their payment credentials with the merchant. Embodiments of this invention may also enable customers to pay anonymously or via an alias and enable merchants to accept payments without any payment infrastructure.

Structurally, the heart of a PCPS embodiment is a payment bus that acts as a store—and forward conduit through which payers and payees exchange payment-related messages within a uniform name or address space. What this means is that (a) payers, payees and payment-related messages have unique identities through which they can be referenced and retrieved, and (b) payment requests from merchants are no longer internal, transient records inside a merchant's cash register or IT system, but are externalized and placed into the payment bus as first-class objects, (c) the bus can deliver a payment message synchronously and without polling to a designated recipient, and (d) the bus can also deliver messages on demand in case of system failure or if the recipient is not known when a payment request is made (embodiments E2 and E4). As such, payment requests can be accessed from anywhere on any device via the Internet. As a result, a payment request can originate in one place—say, at a cash register or an online shopping cart—and can be paid from a different device and at a different time by the customer.

We now delve one level deeper to introduce payer agents and merchant agents. The agents act on behalf of (and as proxy for) payers and merchants. They handle the mechanics of integration with the payment bus and payment gateways, the tedium of bookkeeping, authentication, and other low-level functions. FIG. 06 depicts a scenario from one embodiment: when a payer checks out at a store, the merchant sends a payment request to the merchant agent and displays the request's ID as a QR code. The merchant agent places the request in the payment bus. When the payer scans the code with her mobile, the payer's agent retrieves the request by ID from the bus and displays it in the payer's device. The payer can enter a payment credential. The payer agent contacts a payment gateway to complete the payment and places a payment transaction record confirming the payment in the payment bus. The bus ferries it to the merchant agent who verifies the transaction and credits the merchant.

The payment bus differs from today's payment systems in many important ways. First, the bus nature of the payment bus enables all the parties to synchronously receive data that concerns them. Second, the address space of the bus makes customers, merchants, and transactions uniquely addressable by anybody with right access credentials. Third, the externalization of the payment request through the bus eliminates the tenuous nature of the transient association between a transaction record and a customer. This means that a transaction can originate at one device in one organization and can be accessed from another device elsewhere immediately or at any later time through its unique ID.

Since the transaction is no longer owned by or hidden inside a merchant's cash register or IT system, it is no longer confined to be paid only through that merchant. It can be paid directly by the payer through any payment gateway or through any agent of the payer's choice. As a result, this invention, among other things, provides a paradigm that is neither merchant-centric nor does it create a walled garden. Instead, the payment bus provides a federated architecture that accommodates any number of payment gateways, payer agents and merchant agents to coexist and cooperate.

With such a federated architecture and payment bus in place, a cash register is no more than a merchant ID that may be displayed as text, barcode, QR code or any other suitable coding scheme. When a payer inputs this ID into their mobile device, the payer is able to make a secure payment via the payment bus to the merchant. The payer may specify the amount or access the latest payment request created by the merchant. In some embodiments, the merchant might display a dynamic ID on a display wherein the ID corresponds to the ID of a specific payment request. The payer may even add a tip amount to a requested payment amount and complete the payment transaction.

A ticket vending mechanism may be implemented by the merchant or through a merchant agent. In one embodiment, a merchant agent specializes in ticket vending and enables merchants to vend tickets by filling a simple form that provides particulars of the ticket to be vended. Customers purchase tickets by scanning a QR code and merchants can verify the authenticity of purchased tickets (FIG. 30, 32).

LIST OF FIGURES

FIG. 01 provides a high-level pictorial view of the Merchant-Centric Payment paradigm.

Figure 6:
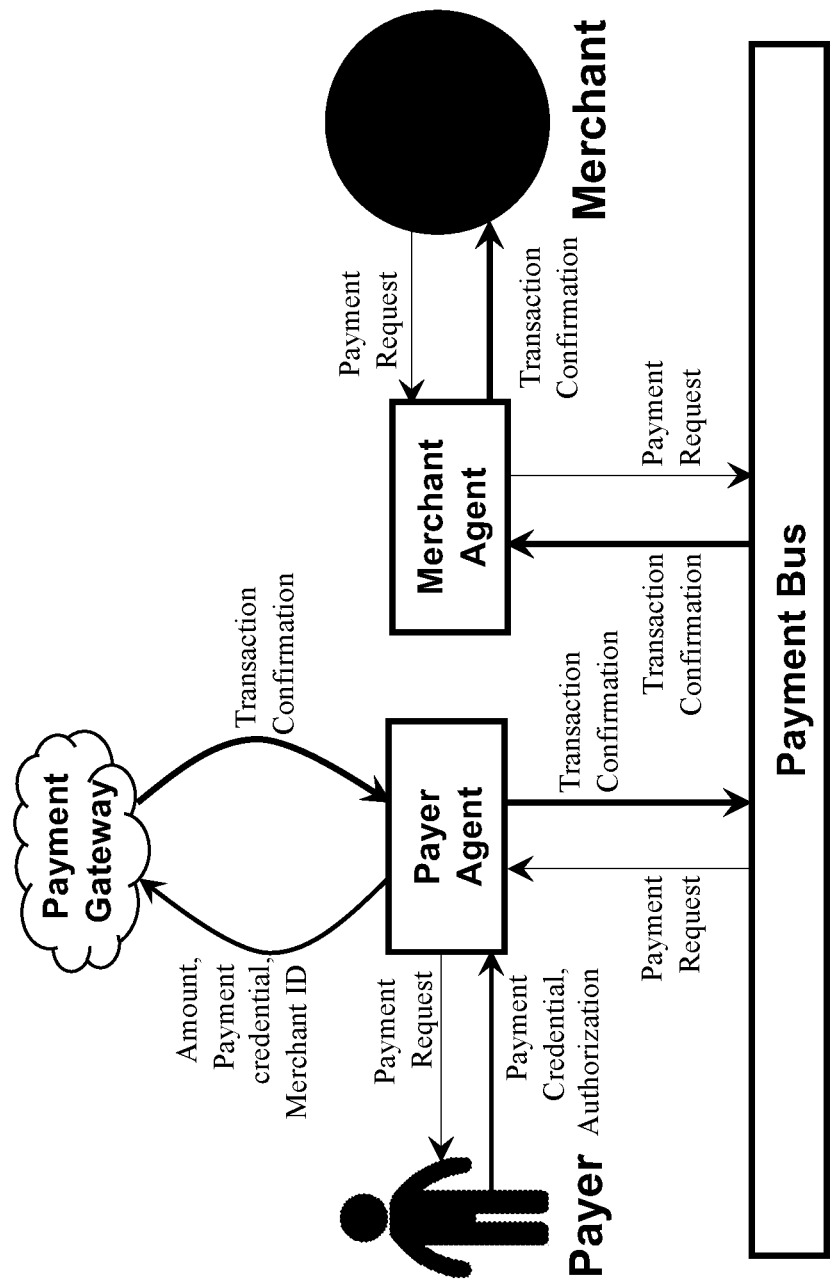

FIG. 06 provides a summary of the of the payment method described in this document.

Figure 7:
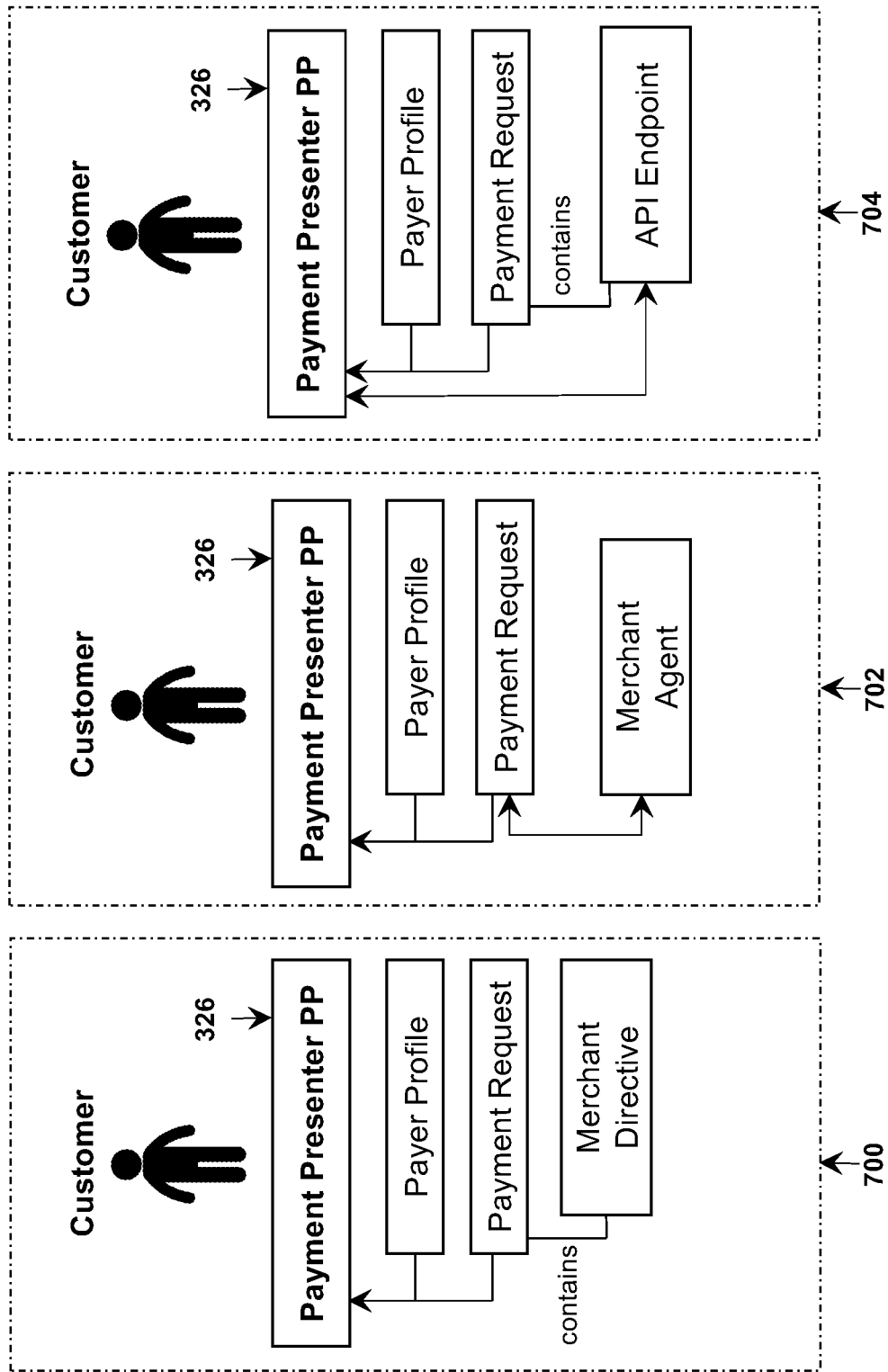
Figure 8:
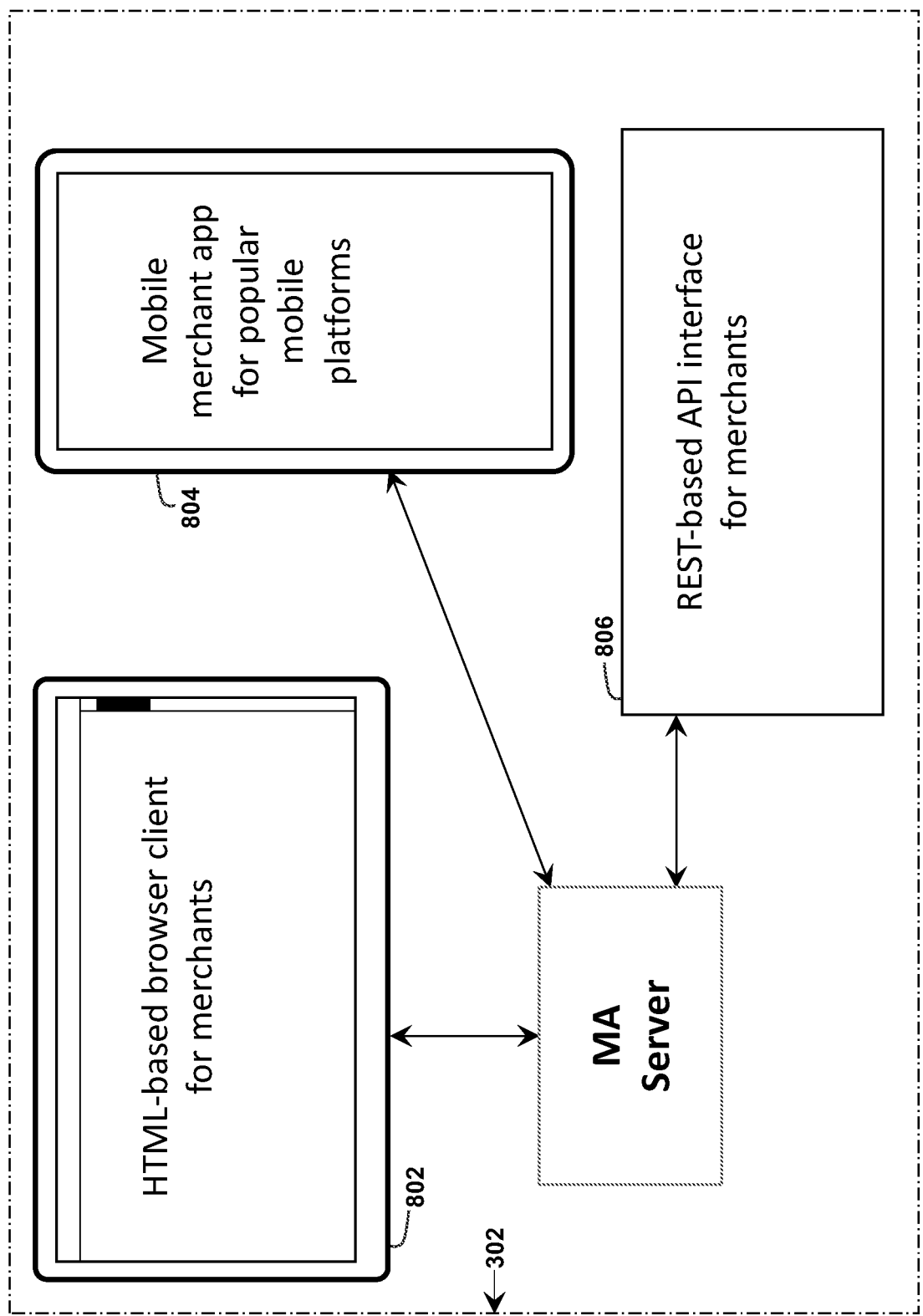

FIG. 07 depicts different architectures for Payment Presenter used in some embodiments FIG. 08 depicts different technical architectures for Merchant Agent.

Figure 9:
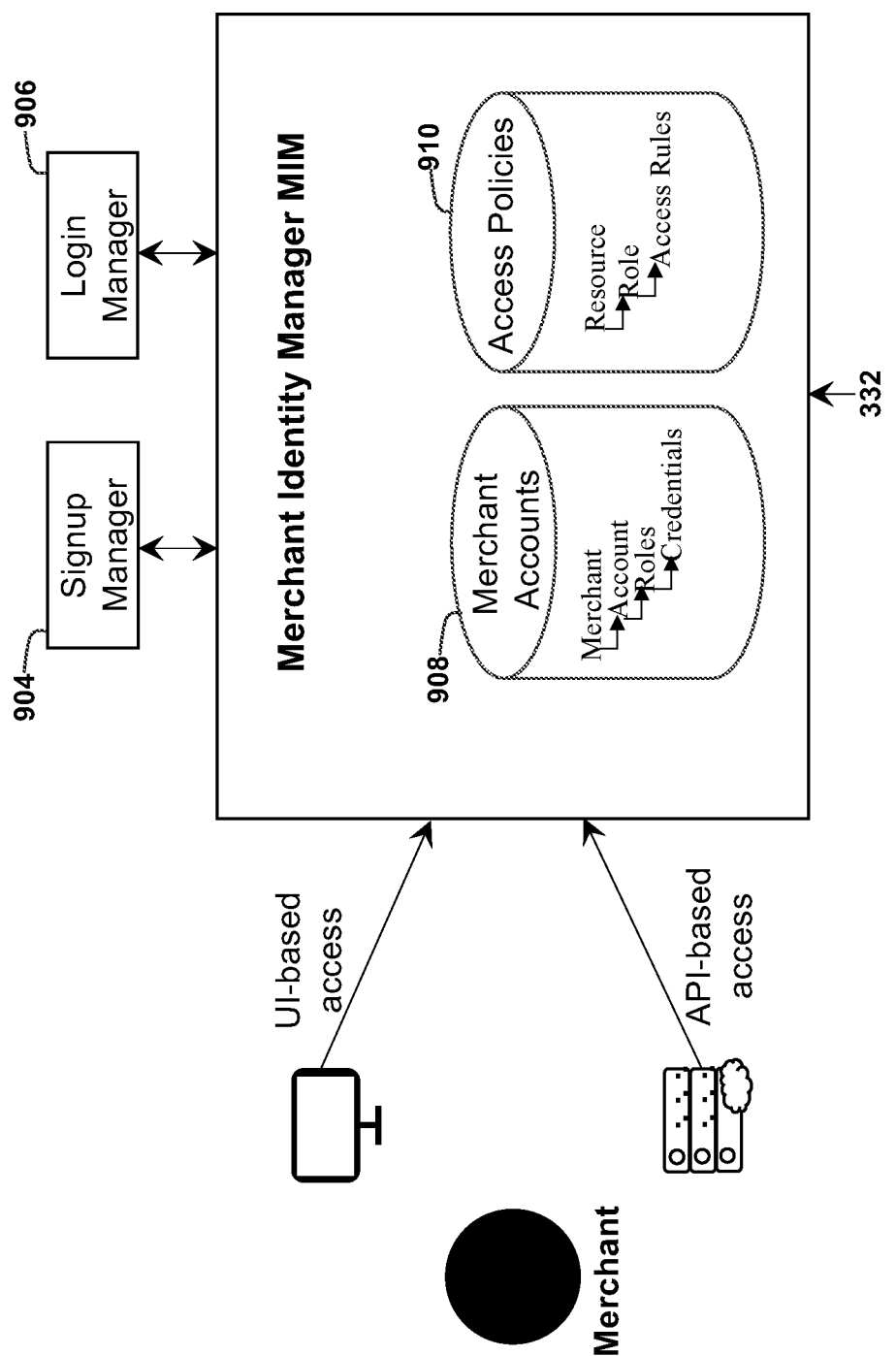

FIG. 09 is a schematic of the Merchant Identity Manager MIM.

FIG. 10 is a screenshot of the Merchant Profile Manager MPM from an embodiment.

Figure 11:
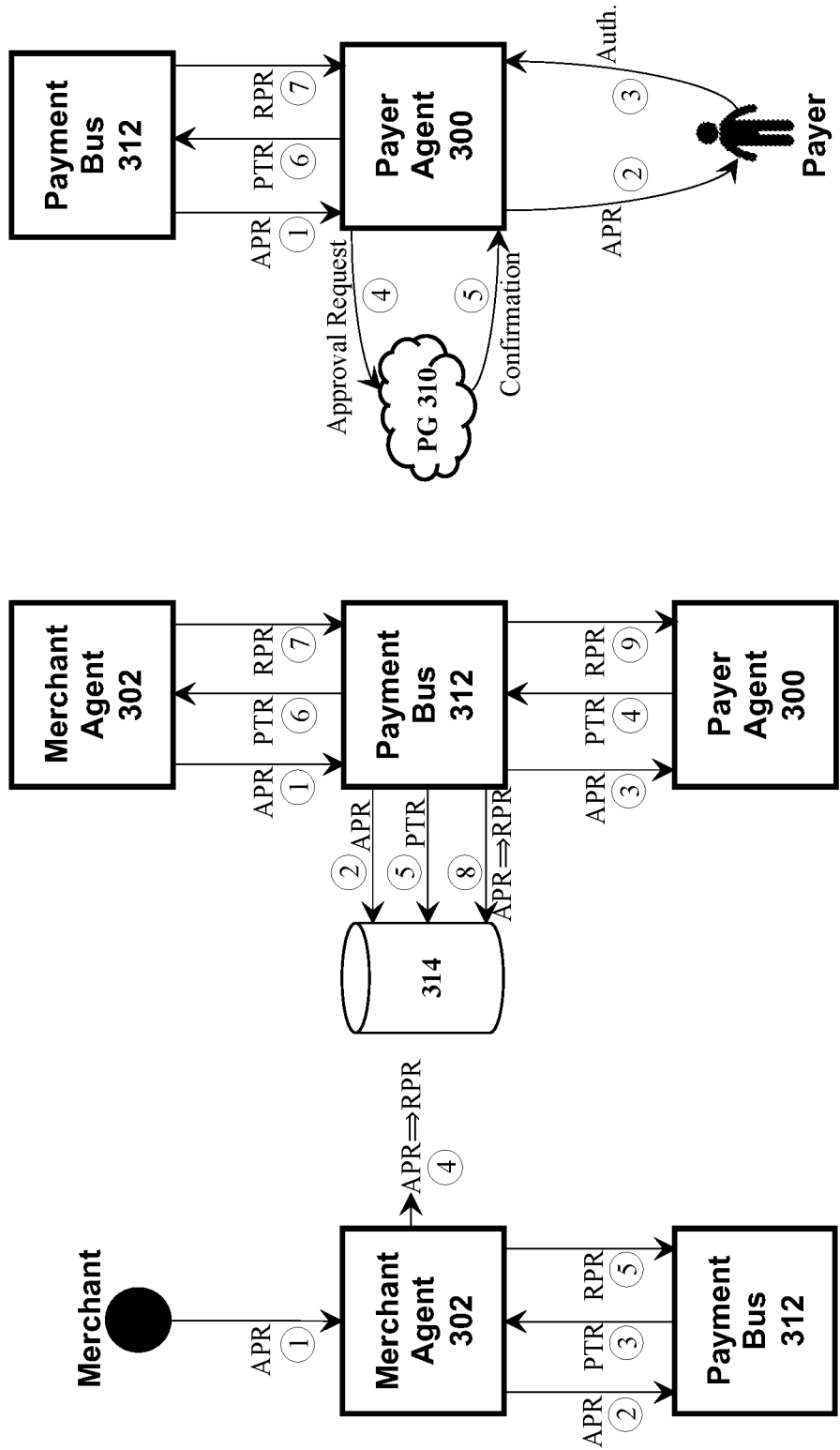

FIG. 11 depicts the dataflow of E0 from the point of view of MA 302, PA 300 and PB 312.

Figure 12:
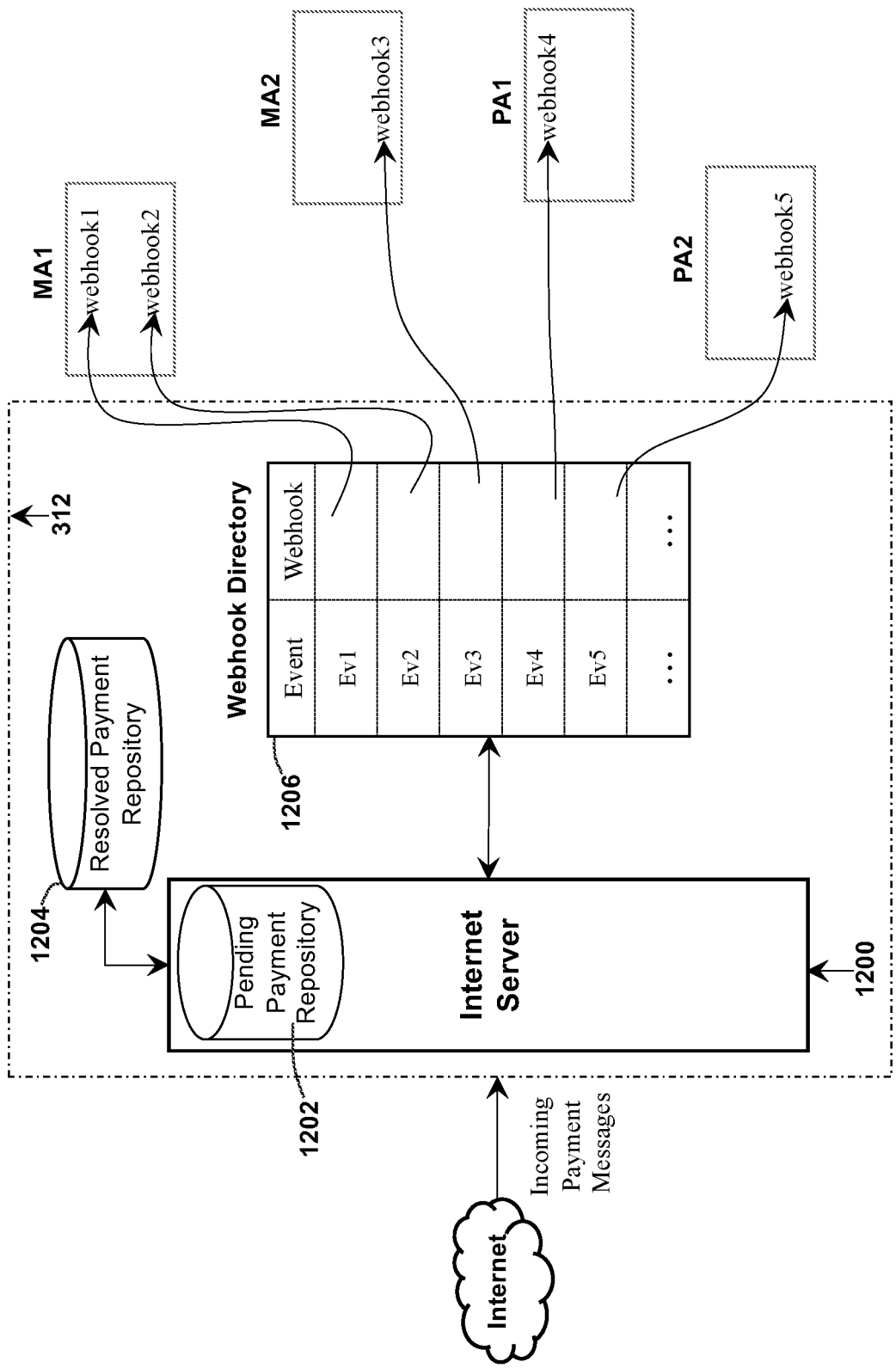

FIG. 12 depicts a Payment Bus implementation using webhooks.

Figure 13:
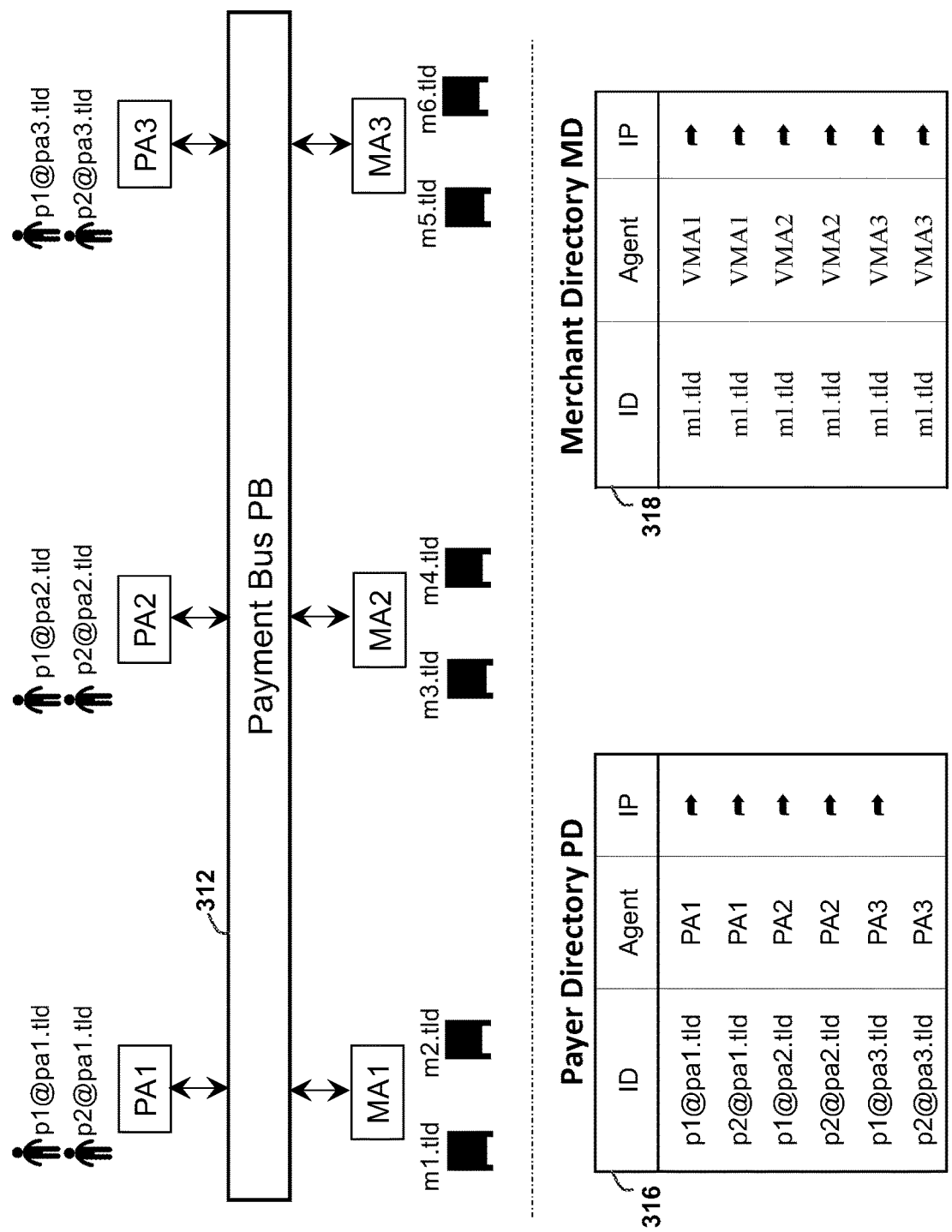

FIG. 13 depicts many payer and merchant agents in a single address space.

FIG. 14 is a screenshot of a merchant creating a payment request and its JSON representation.

FIG. 15 is a screenshot from E0 of a payment request and its payment transaction record PTR.

Figure 16A:
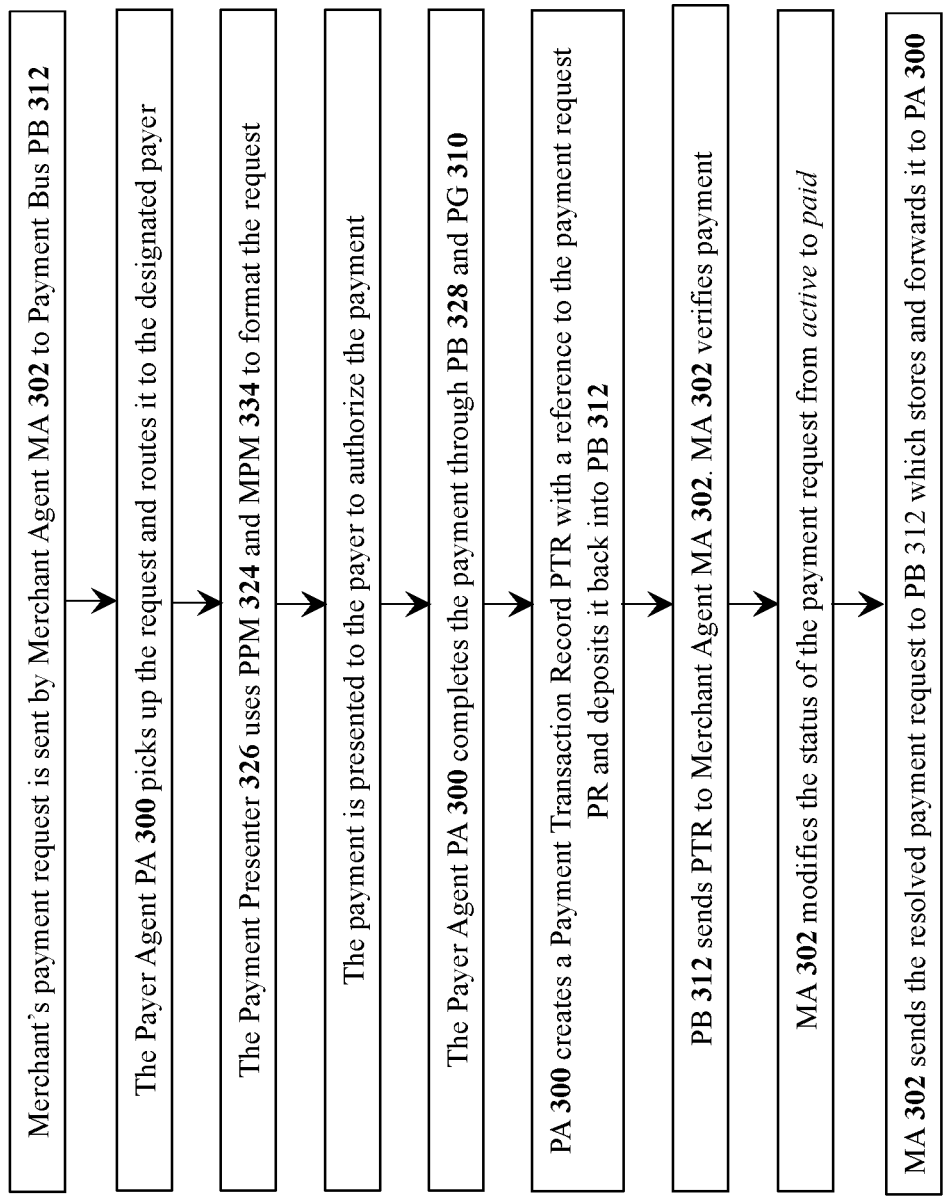

FIG. 16A depicts the steps that subsystems of E0 go through to execute a payment process.

Figure 16B:
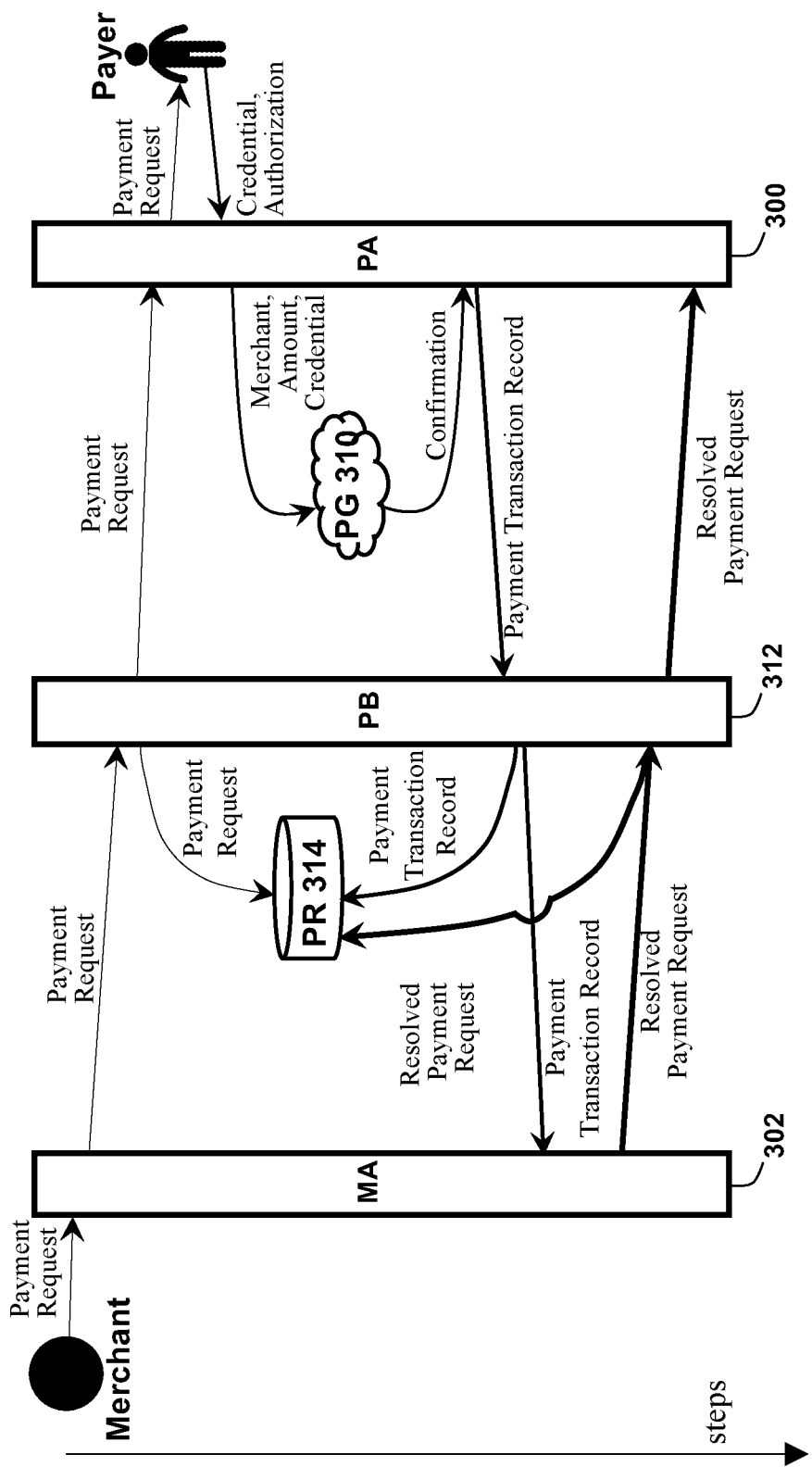

FIG. 16B depicts the dataflow of embodiment E0 as it executes the steps of a payment.

Figure 17:
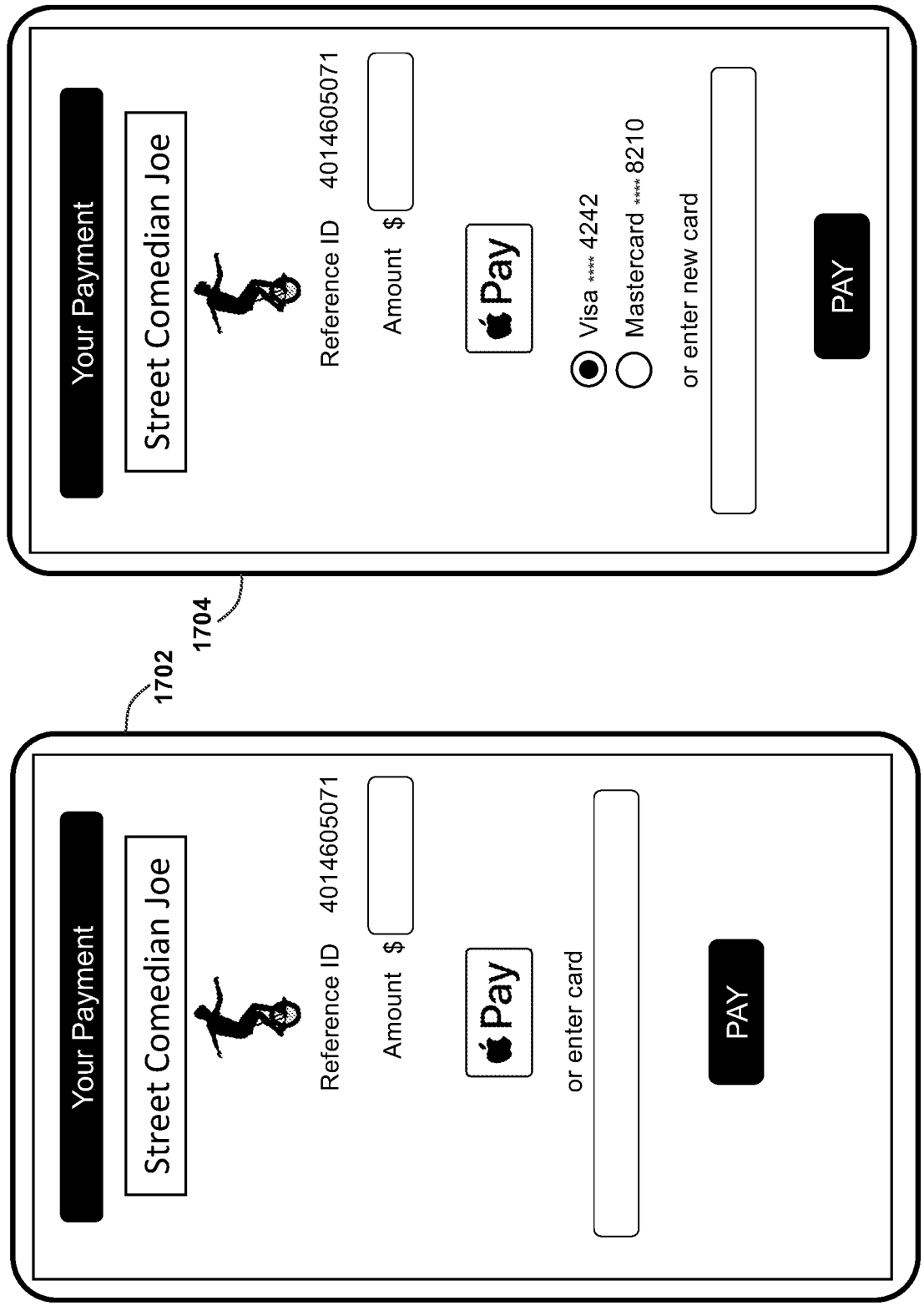

FIG. 17 contains screenshots of the payment screen from E1.

Figure 18:
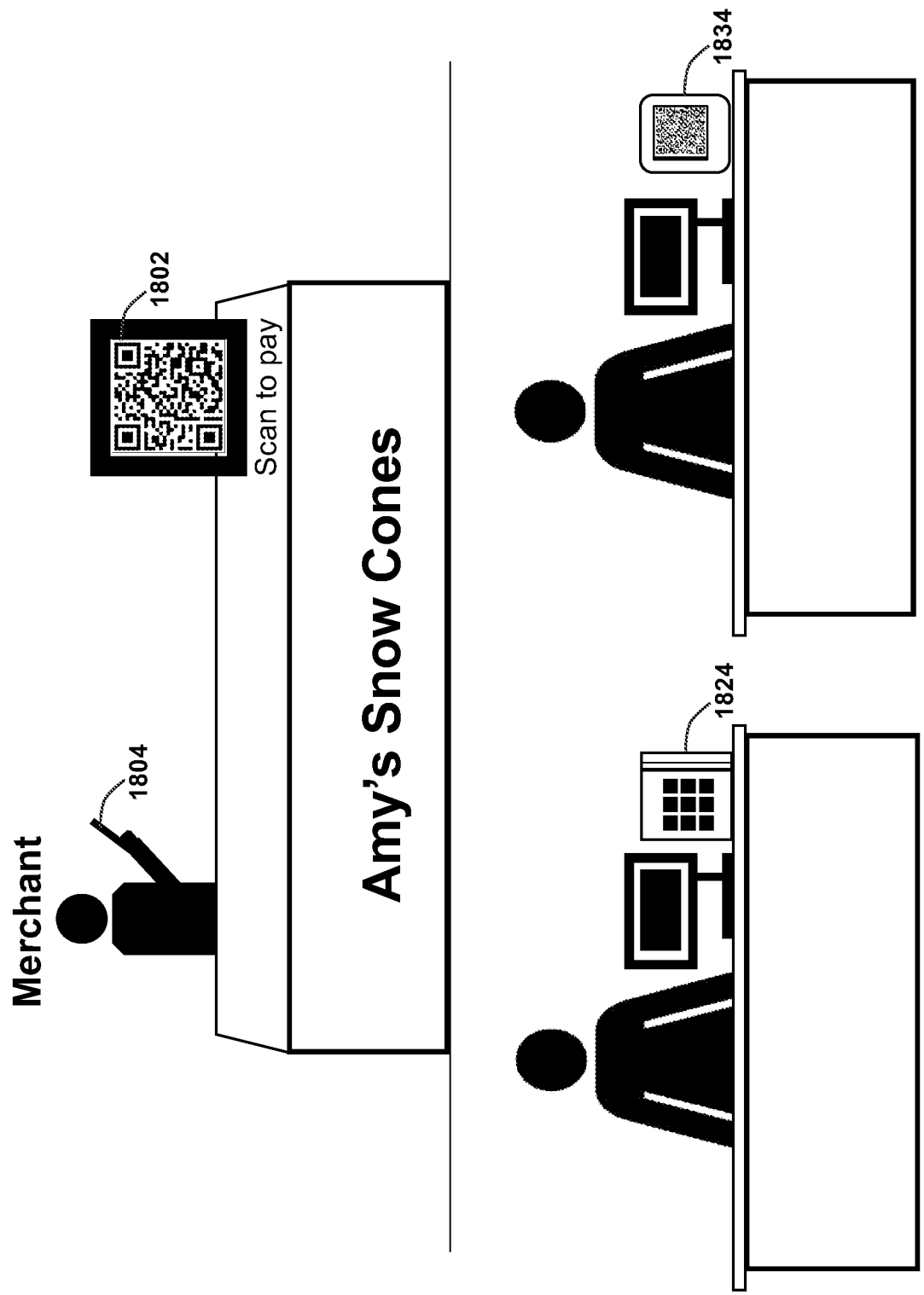

FIG. 18 shows different scenarios for an infrastructure-less cash register.

Figure 19:
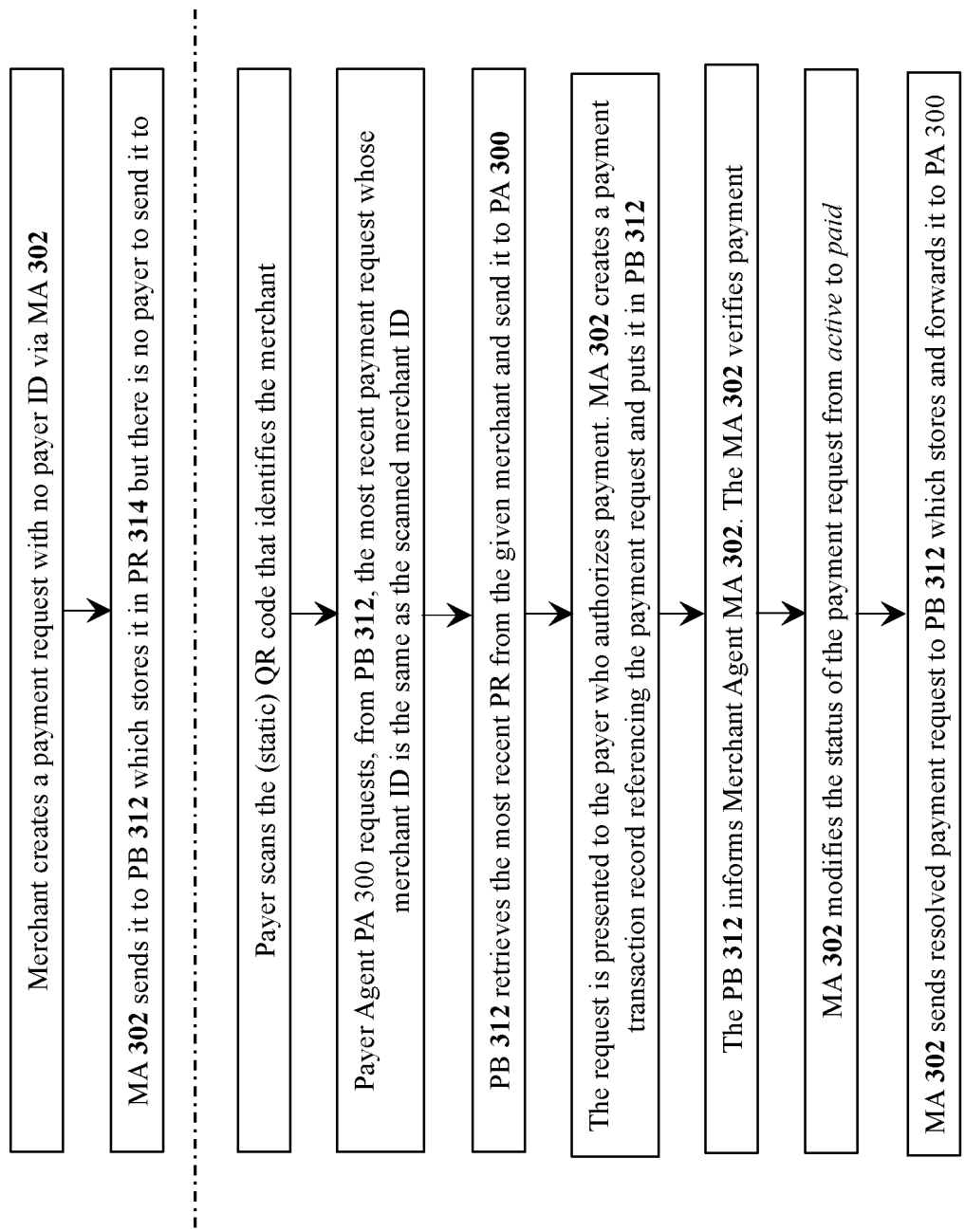

FIG. 19 shows the process flow for the infrastructure-less cash register.

Figure 20:
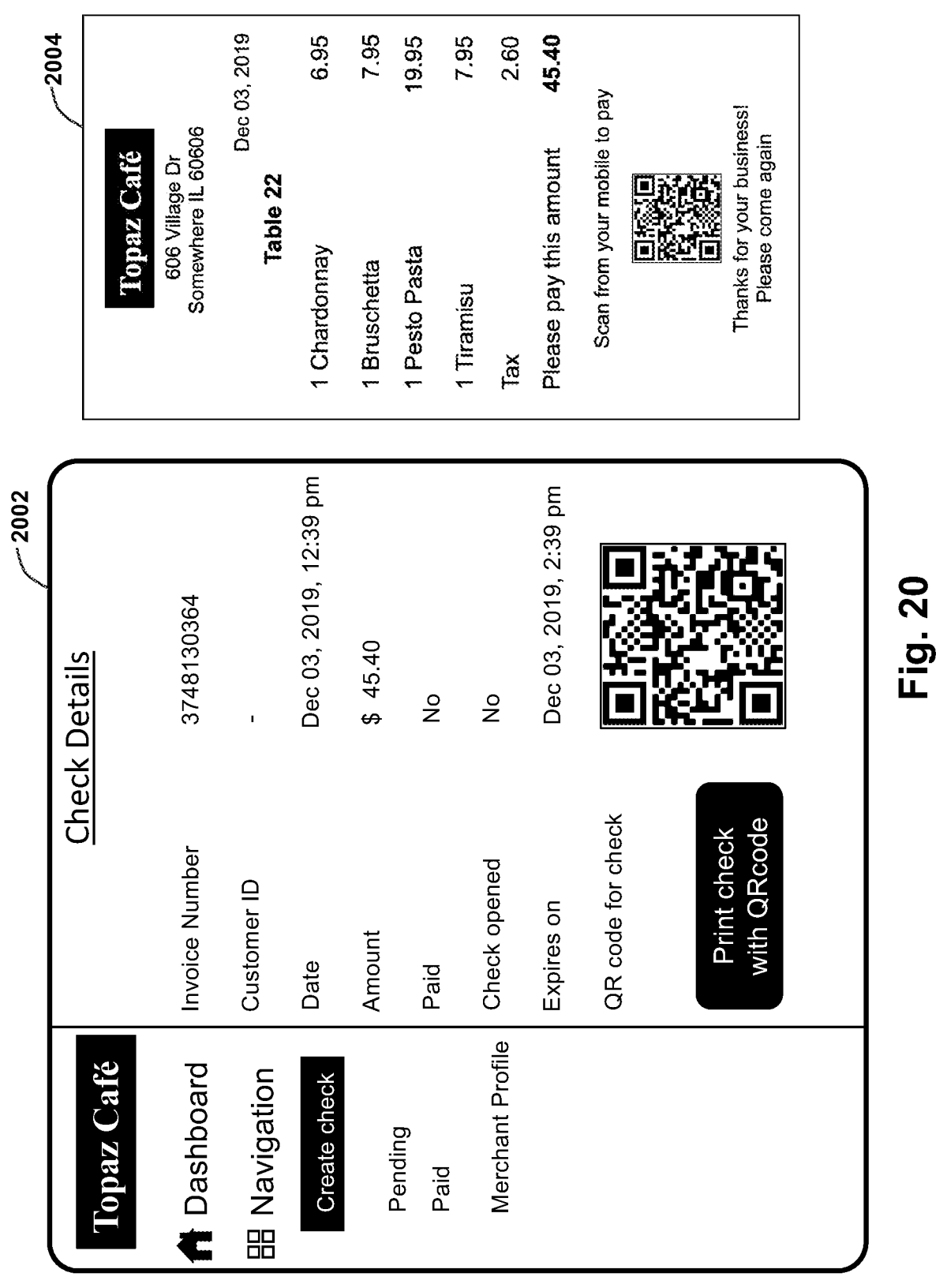

FIG. 20 shows a restaurant creating a payment request for a customer and the printed check.

FIG. 21 shows the payment and payment acknowledgment screens from E2.

Figure 22:
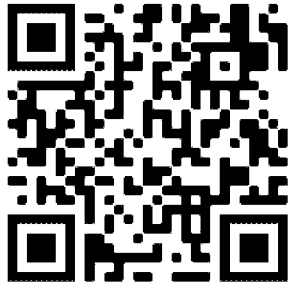

FIG. 22 shows a bus company using a poster as a ticket vending kiosk (scenario for E5).

Figure 23:
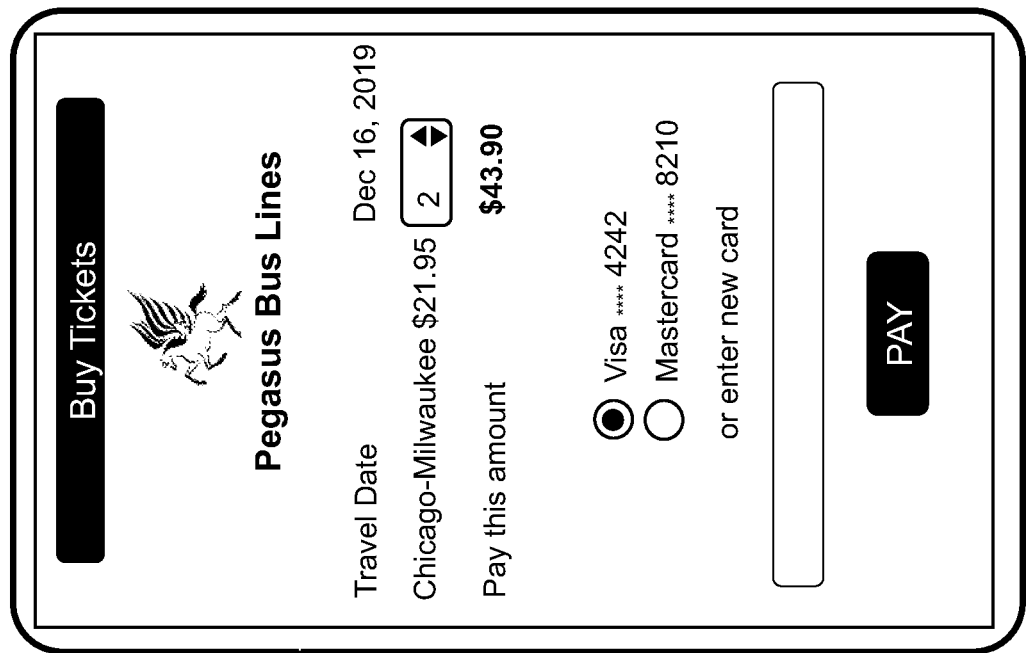

FIG. 23 shows the JSON for a payment request and the payment screen for a ticket.

Figure 24:

FIG. 24 depicts the delivered tickets and the app for their verification.

Figure 25:
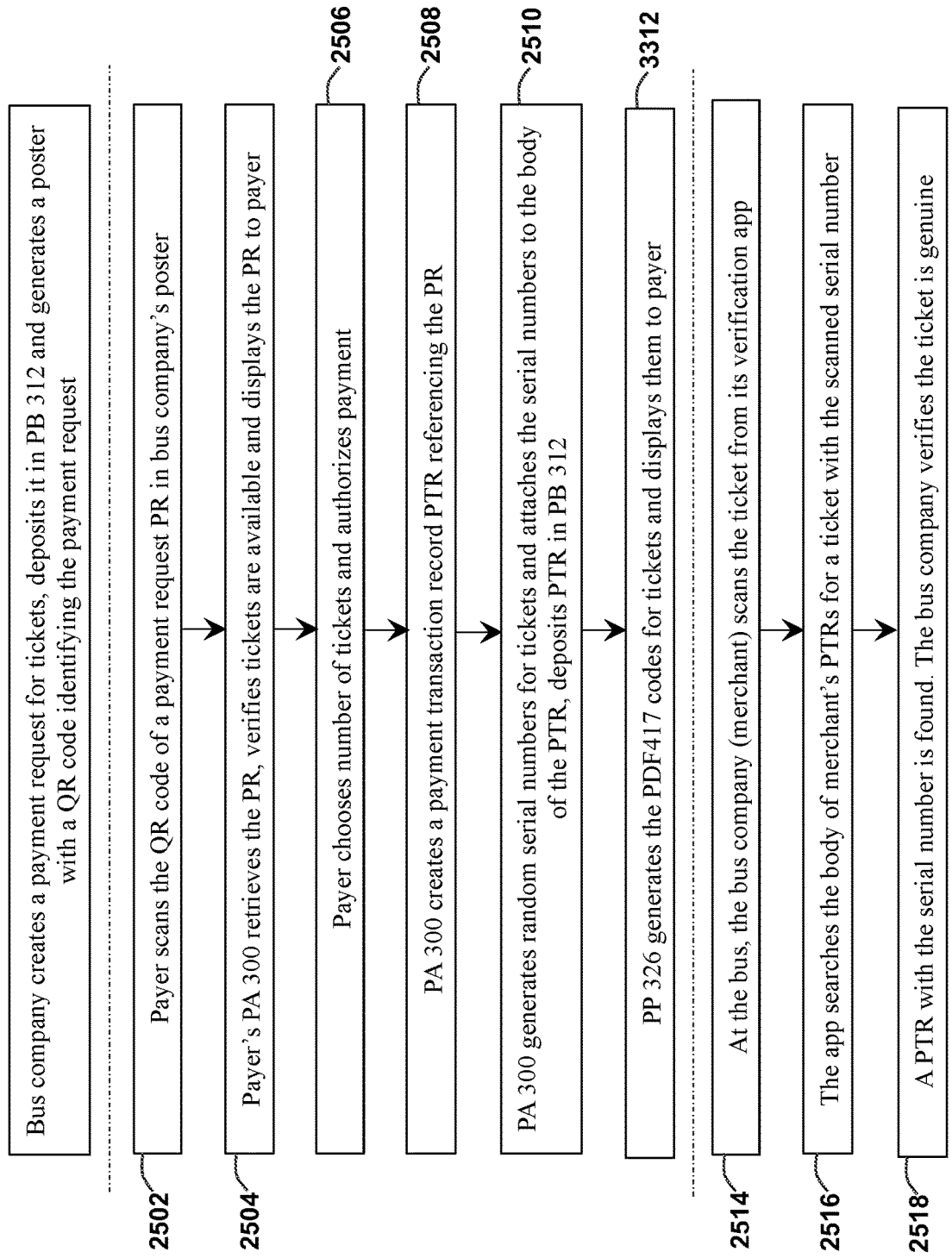

FIG. 25 depicts the process flow in E5.

DETAILED DESCRIPTION

Structure of the Invention

Figure 1:
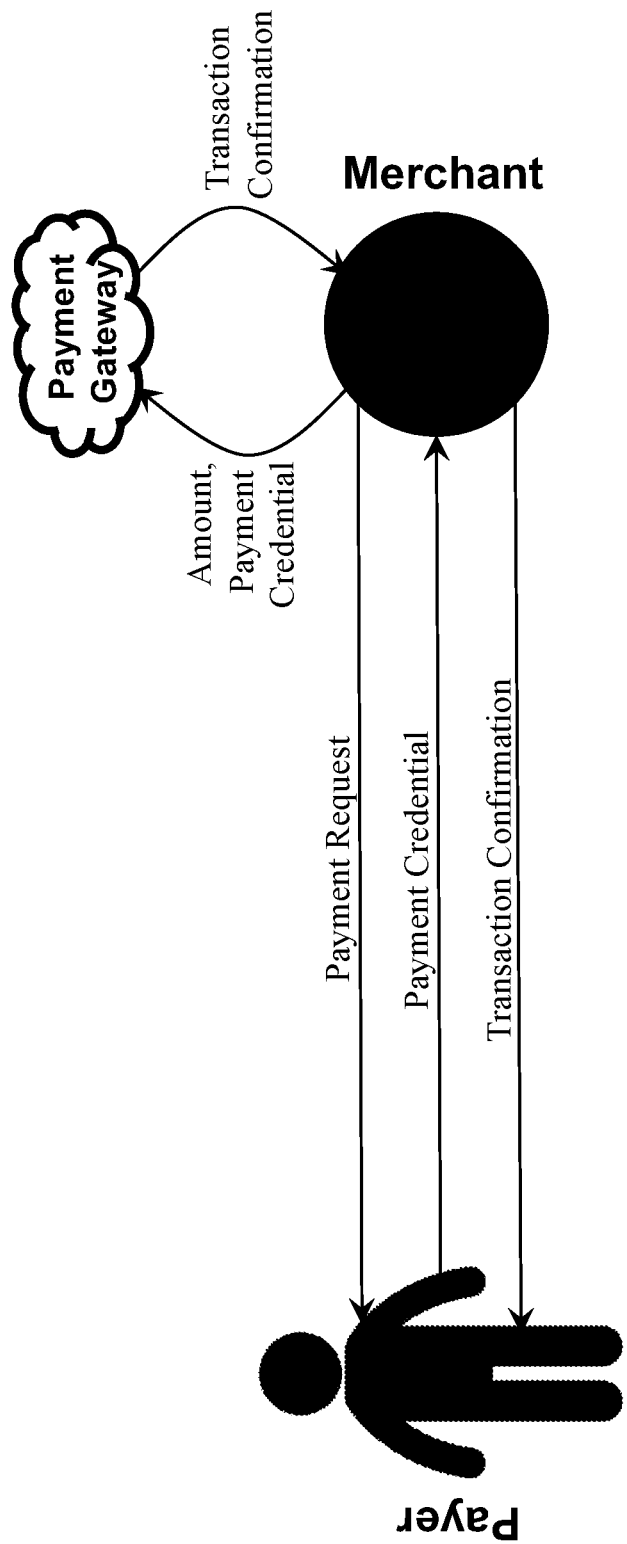
Figure 2:
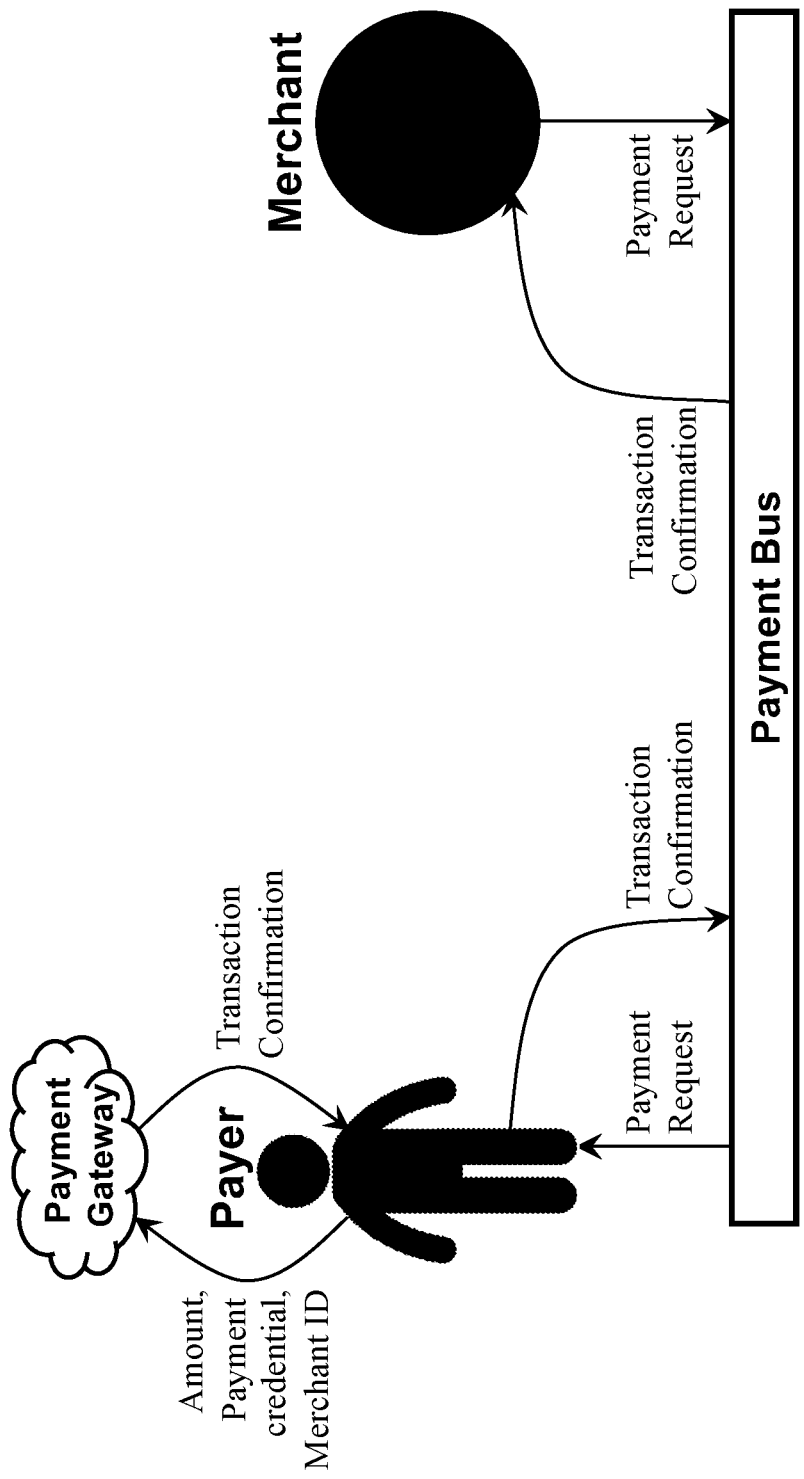
FIG. 02 is meant to provide a high-level overview of our invention.
Figure 3:
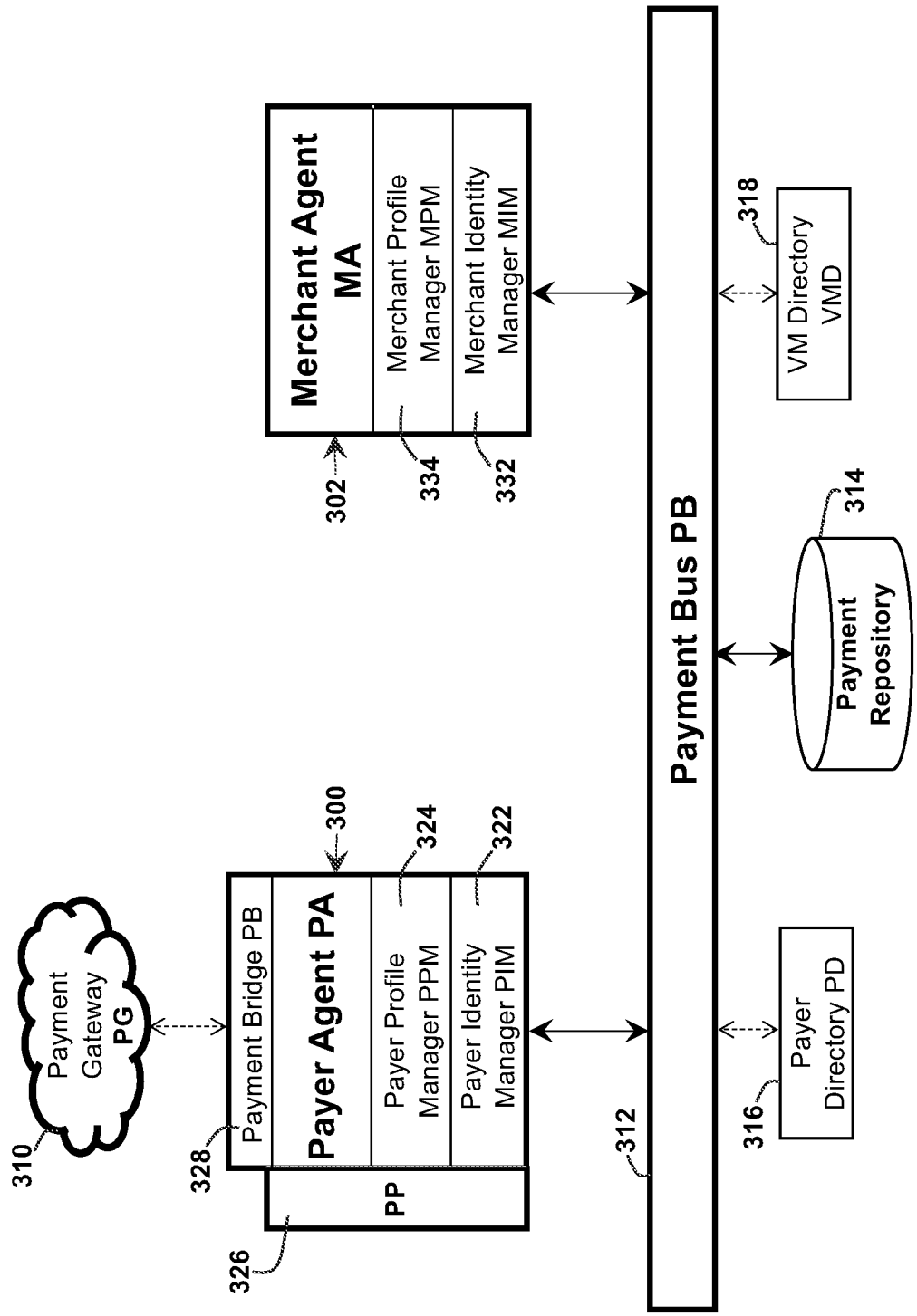
FIG. 03 is a schematic that shows the structure of our invention and its major components.

Our invention, embodiments of which we refer to as a Payer-centric Payment Systems or PCPS, comprises the following subsystems as depicted in FIG. 03:

1. one or more Payer Agents PA 300, where a given PA 300 acts as an agent for one or more payers and manages all aspects of a payer's interaction with the PCPS, 2. one or more Merchant Agents MA 302, where a given MA 302 acts as an agent for one or more merchants and manages all aspects of a merchant's interaction with the PCPS,
3. a Payment Bus PB 312 that acts as a store-and-forward conduit and enables parties connected to the PCPS to exchange payment-related messages with each other,
4. a Payment Repository PR 314 that acts as the storage cache of the PB 312 and stores active payment requests, resolved payment requests, and payment transaction records. Some embodiments store the pending and resolved payments in physically separate databases, Pending Payment Repository and Resolved Payment Repository, while others may store them as different tables in the same database,
5. a logical Payer Directory PD 316 is simply a directory of the identities of all payers recognized by a PCPS embodiment. In some embodiments it may be physical and explicit, whereas in others, it may be implicit and defined by routing tables and payer identities maintained inside payer agents, and
6. a logical Merchant Directory MD 318 is simply a directory of the identities of all merchants recognized by a PCPS embodiment. Much like the payer directory, a merchant directory may be explicit or implicit and we will discuss them both when we discuss the address space of a PCPS.

Payer Agent

A payer registers with a PCPS through a Payer Agent PA 300 of his or her choice and the agent is responsible for providing all capabilities that enable that payer to conduct payments through the PCPS. These capabilities include, but are not limited to, registering, and authenticating the payer, presenting payment requests directed to that payer, managing, and monitoring that payer's payment sources (such as credit cards, bank accounts etc.), completing payments for that payer, and depositing that payer's payment transactions into PB 312.

Figure 4:
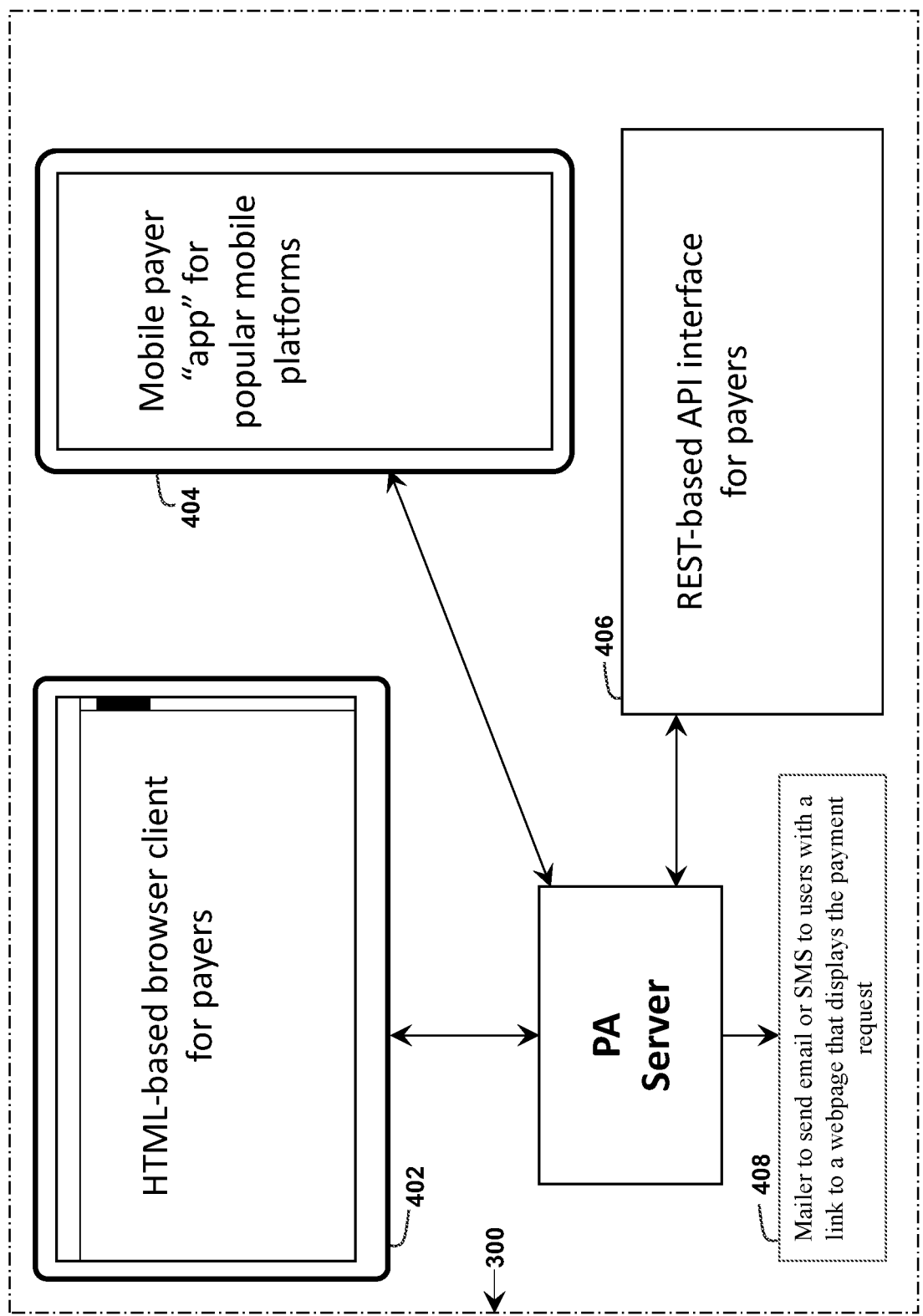
FIG. 04 depicts different technical architectures for Payer Agent as used in some embodiments.

In one embodiment, the PA 300 comprises a web server and several different types of clients (see FIG. 04). A PA server serves a browser client 402, a mobile client or app 404, an API endpoint for programmatic access 406, and also a mailer 408 to email (or SMS) a link to a webpage that displays a payment request. As an example, assume that a customer, angela@elfpoint.com, has just shopped at Franks Store. To charge her, the store would place a payment request addressed to her in the payment bus. Her PA 300 can deliver the payment request to her through a browser client 402 on a PC, through an app 404 on her mobile device, or can deliver it as JSON through an API endpoint 406 (to, say, her spreadsheet or accounting software). Based on Angela's preferences, it can also use the mailer 408 to send her an email with a link to a webpage that displays the payment request.

The Payer Identity Manager PIM 322, a subcomponent of PA 300, is responsible for managing the identity of the payers registered with that PA. Besides well-known processes of registration, login and multi-factor authentication, a given PIM may also provide auxiliary identities (e.g., phone number) and aliases for its customers. In one embodiment, a PIM 322 uses passwords and session cookies to authenticate session-based access, and OpenID Connect with OAuth 2.0 for registering API clients for programmatic access with API tokens. Payer accounts may have roles with specific access privileges. For example, payers can authorize their auditors and tax preparation software to access a part of their data. The PIM is responsible for managing payer accounts and roles, and imposing authorization rules when anyone accesses PA 300.

Figure 5:
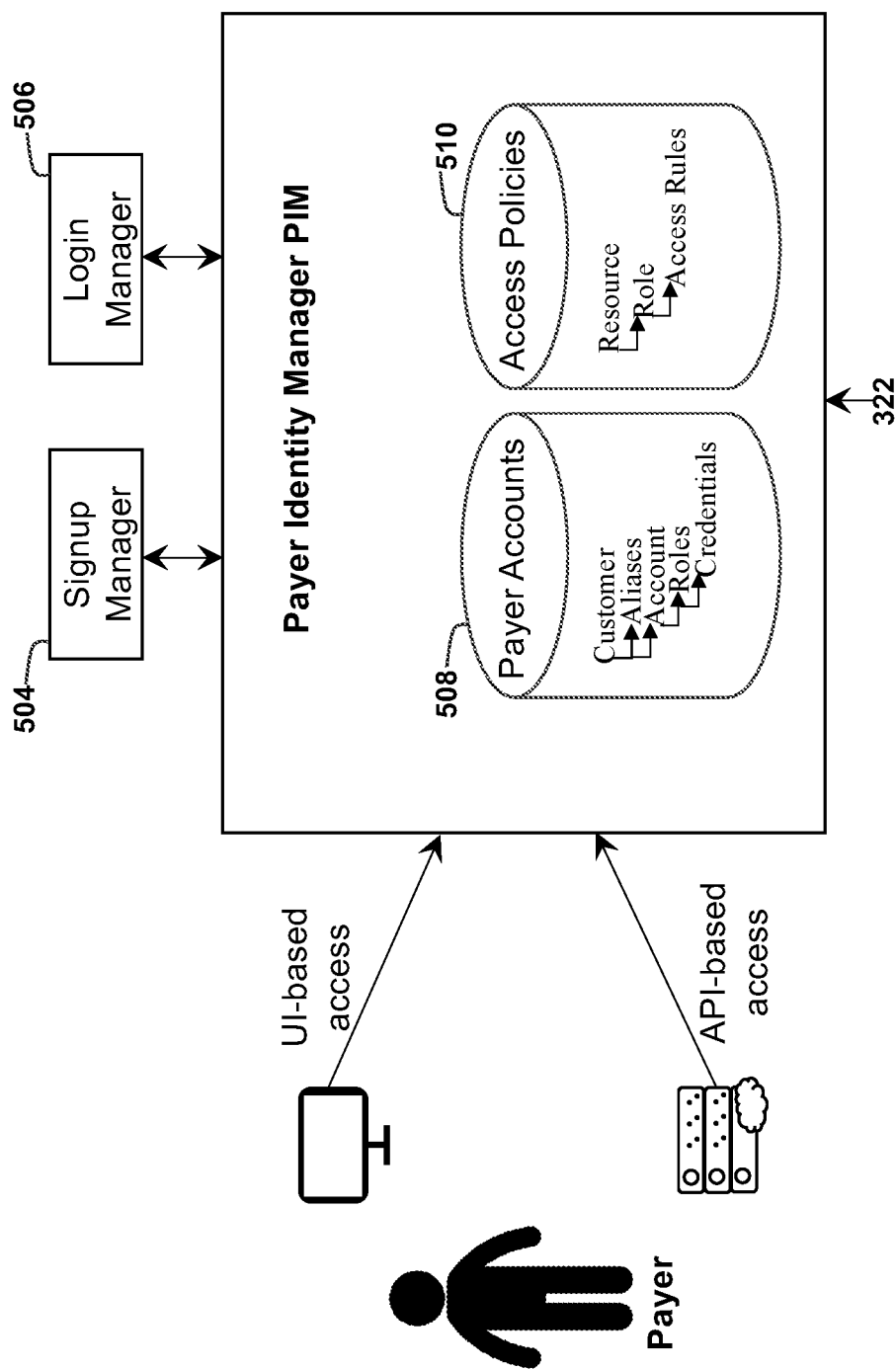
FIG. 05 is a schematic of the Payer Identity Manager PIM.

FIG. 05 is a schematic of a PIM 322 from one of the PCPS embodiments. All accesses to the PA 300—whether through a user interface or through APIs—go through the PIM which checks the access credentials against a database of Payer Accounts 508 and a database of Access Policies 510. If improper or no credentials are presented, the user is directed to the Signup Manager 504 or Login Manager 506 or presented with an appropriate error message.

The Payer Profile Manager PPM 324 is responsible for collecting and managing the customer's profile. The customer profile includes basic information about the customer including but not limited to name, phone numbers, aliases, shipping addresses, payment sources such as cards and bank accounts, as well of customer preferences including, but not limited to, where to deliver what types of payment requests, what types of payment alerts to provide, when to inform or warn of impending payments and so forth.

The Payment Presenter PP 326 is responsible for formatting and presenting a payment to a payer. Unlike the MCP paradigm where a merchant may implement a specific payment interface, the PCP paradigm must cater to many different types of merchants. For example, a restaurant may want the payment request to include a field for its customers to add tips; an eCommerce vendor may need the payment request to prompt customers for a shipping address; or a store may want the payment request to include a field where the customer can provide feedback about their shopping experience. To cater to all these cases, PP 326 depends on both the merchant profile (discussed below) as well as the payer's profile. For example, a payer's profile may direct that all payments be presented in Canadian dollars; a merchant profile may direct that all payment requests include an extra field for payers to add a tip to the payment.

FIG. 07 is a schematic showing some architectures for PP 326 to obtain directives from a merchant or merchant Agent in presenting its payment requests to payers. The approaches shown are illustrative, not exhaustive. The simplest approach is 700 where the payment request itself includes merchant directives in its body. 704 depicts a flexible but more complex approach where the request includes an API-endpoint that PP 326 can call in order to render parts of the payment screen. 702 is another approach where PP 326 retains control but takes directions in real-time from the MA 302. Embodiments provide examples.

Payment Bridge PB 328 is an abstraction layer between PCPS and third-party Payment Gateways PG 310, so that a PCPS is loosely coupled to the internal details of payment gateways. In some embodiments, the PB 328 is implemented as a set of drivers for a range of payment gateways such as Stripe, PayPal, Payment Tech etc.

Merchant Agent

A merchant registers with a PCPS embodiment through a Merchant Agent MA 302 and the agent is responsible for providing all capabilities that enable that merchant to accept payer-centric payments through the PCPS. Such capabilities include but are not limited to authenticating the merchant, placing the merchant's payment requests into the Payment Bus PB 312, providing the merchant with information about active and resolved payment requests, and managing the merchant's account with the PCPS. In some embodiments, the MA 302 provides sophisticated data analysis tools such as charts, reports, seasonal sales analysis, predictions and so forth. An embodiment may also provide tools to export data to third-party packages.

In one embodiment, the MA 302 comprises a web server and several types of clients as depicted in FIG. 08. The MA server serves a browser client 802, a mobile client or app 804 and an API endpoint 806 that accepts payment requests programmatically from merchants. The web client 802 and mobile client 804 enable small merchants to manually create payment requests such as the ones in 1402 (FIG. 14) and 2002 (FIG. 20).

The Merchant Identity Manager MIM 332 is responsible for managing the identity and login credentials of a merchant. A merchant may own multiple accounts with different roles and privileges. For example, a small merchant may have a simple username and password with all privileges, whereas a chain store with several outlets as well as a website may have accounts with many roles such as store manager, branch manager, checkout clerk, website manager etc., who may not only have passwords for login and session-level authentication, but also API tokens for programmatic access. The MIM 332 is responsible for creating and managing merchant accounts and imposing authentication and authorization rules across all merchant access to a PCPS. In one embodiment, MIM 332 uses OpenID Connect with OAuth 2.0 for managing merchant accounts and distributing API access tokens.

FIG. 09 is a schematic of a MIM 332 from one of the PCPS embodiments. All accesses to the MA 302—whether through a user interface or through API—go through the MIM 332 which checks the access credentials against a database of Merchant Accounts 908 and a database of Access Policies 910. If improper or no credentials are presented, the merchant is directed to the Signup Manager 904 or Login Manager 906 or presented with an appropriate error message.

As mentioned earlier during our discussion on Payment Presenter PP 326, unlike the MCP payments where the merchant controls how the payment is presented to the payer, with our invention, the merchant depends on PP 326 for how the payment request is presented to the payer. For this, the PP 326 depends on both the payer's preferences (managed by Payer Profile Manager PPM 324) and the merchant's profile, managed by the Merchant Profile Manager 334. The Merchant Profile Manager MPM 334 is responsible for collecting the merchant profile information. It uses a question-answer paradigm to help the merchant specify the customizations that the merchant needs in how the PCPS embodiment manages the payment process for that merchant. Further, the merchant profile may also provide input to the Payment Presenter PP 326 on how to display payment requests from that merchant. FIG. 10 is a screenshot of a merchant profile from an embodiment called Elfpoint which we will revisit later.

The Payment Bus

The Payment Bus PB 312 serves four functions that are critical for a robust and scalable payer-centric payment system. First, it acts as a data conduit across different parties within a well-defined name or address space so that payers, merchants, and payment messages all have unique identities with which they can be referenced and retrieved. As such, it creates a loosely-coupled, fully federated payment system: merchants—operating through different merchant agents, possibly controlled by different organizations—can request payment and obtain payment confirmation from payers—operating through different payer agents, possibly controlled by different organizations. A merchant or payer can switch agents—and new agents can join a PCPS embodiment—without affecting the payment flow.

Second, the payment bus externalizes a payment request as a persistent object in Payment Repository PR 314, so the payment request is no longer dependent on the merchant's cash register or website for its fulfillment. The request can be accessed and paid from anywhere.

Third, PB 312 acts as an event and data bus that delivers payment messages to concerned parties as and when the messages arrive. This helps maintain a synchronous payment flow across the PCPS, without the agents polling a central repository or maintaining point-to-point contact.

Fourth, PB 312 is a store-and-forward pipe that delivers payment messages on demand. Hence it is tolerant of system and network failures; further, externalization with persistence means that a payment request can be created by a PA and (later) "claimed" by a payer. Contrast this with today's Internet payments where a network failure can result in the failure of a transaction or can result in duplicate transactions. We are all familiar with messages such as "this action may make take a long time. Please do not close the browser or press the browser's back button" when we click the "pay" button for an eCommerce transaction.

As such, the payment bus provides an open infrastructure for an "internet of payments" as opposed to walled-garden payment systems of today. The payment bus provides a loosely coupled federated architecture for merchants to request payment from payers and payers to fulfill these payment requests. We have kept the payment bus intentionally simple so it can be a very general: it acts as a synchronous store-and-forward and as an (asynchronous) on-demand retrieval mechanism for payment messages. It is stateless, so agents have to manage state through their payment records.

Payment Messages

PB 312 stores and transmits discrete pieces of information that are interchangeably called payment messages or payment records. One PCPS embodiment implements two types of records: Payment Requests PR and Payment Transaction Records PTR While these records are structured objects within PA 300 and MA 302, they may be serialized with respect to PB 312. We note that serialization refers to the conversion of a structured object into a standards-based representation so that it can be transmitted from one system to another. In some embodiments, payment records are serialized into JSON (JavaScript Object Notation, an established standard), though other embodiments may serialize them to other standards. PRs are used by merchants to request a payment, and PTRs are used by payers or payer agents to confirm a payment.

PRs and PTRs are important but not exhaustive of the kinds of information that need to flow through a payment bus to support payment-centric payments. With our embodiments we show how a number of scenarios can be supported with just these two. Other embodiments may use additional types of records to handle scenarios such as refunds, deposits, credit holds etc. We expect a wide range of payment record types to emerge as new types of financial instruments are introduced by banks, credit card companies and other players in the financial services industry.

Payment Requests or PRs have a header and a body. The fields and values in the header are unrestricted though many embodiments of this invention recognize the following fields and their associated semantics: type, request ID, merchant ID, customer ID, requested amount, currency unit, expiration date, transaction ID, status, add tips, taxes, information request, tax deductibility and fulfillment count. The body is meant for the merchant or merchant agent to provide information to the payer or payer agent and is not processed by PB 312.

As an example, let's consider a payment request PR 1404 (FIG. 14) in JSON representation from a PCPS embodiment. It has the following semantics: this is a payment request from the merchant whose identity is Frank's Store to customer angela@elfpoint.com for an amount of 29.95 USD, the request is currently active. The payment can be fulfilled when paid once, it is not tax deductible and does not expect a tip. The body of the payment request can contain additional information (e.g., a bill of sale) for the payer.

When a payment request PR is paid by the payer, PA 300 creates a Payment Transaction Record PTR, adds the PR's ID to the PTR and sends both the PR and the PTR to the payment bus PB 312. The purpose of the PTR includes but not limited to (a) providing the Merchant Agent MA 302 a confirmation of the payment, (b) enabling the Payer Agent PA 300 keep track of the details of the transaction, and (c) exchanging any information with the merchant (e.g., a shipping address). In one embodiment, a PTR has three main parts—a header, a tracker, and a body. The header is not encrypted, the tracker is typically encrypted so that it is only intelligible to the Payer Agent PA 300, and the body is for information exchange between the payer and the merchant and could be encrypted. 1504 (FIG. 15) shows a PTR. The header says that it is a transaction record confirming the payment for a specific payment request with an ID of 1127745653 from a merchant called Franks Store to a customer called angela@elfpoint.com for a payment amount of 29.95 USD incurring a transaction commission of 1.21 USD. Further, the transaction is confirmed by the PCPS embodiment with a confirmation number and a timestamp.

When Merchant Agent MA 302 for Franks Store sees this PTR, it would consider the payment request with the ID 1127745653 paid and credit Franks Store's account for the payment. It is worth noting that neither Franks Store nor its Merchant Agent has any knowledge of the payment source (credit card, bank account or whatever) that was used by the payer as that information is not in the header but in the tracker field that is encrypted for and by the PA 300.

The body of the PTR in 1504 (FIG. 15) is empty, but its tracker tracks or contains information about how the payment request was paid and is intelligible only to the Payer Agent PA 300 because it is encrypted. It may be created by the PA 300 itself or by the Payment Bridge PB 328. It specifies that the name of payment gateway PG 310 that was used for completing the payment, the confirmation code provided by the payment gateway, the internal token for the payment source used, and the nickname by which the payment source is known to the payer.

A payment request that does not have the status of "active" is considered "resolved." Either it has been paid, declined, canceled by the merchant, expired, abandoned, or has some other status. In some embodiments (e.g., E1 and E5), the "fulfillment_count" parameter may control when a payment request is considered resolved. In some embodiments, the payment repository PR 314 comprises two logically and/or physically separate repositories called Active Payment Repository and Resolved Payment Repository for more efficient processing. In others, they may be simply different tables in the same physical repository.

Implementing the Payment Bus

In a simple embodiment with just one PA 300 and just one MA 302 residing on the same server, the PB 312 can be implemented as a relational database for the payment messages and an event bus that broadcasts database events. PA 300 and MA 302 can subscribe to the event bus as listeners and be notified of database events and respond only to events that concern them. While not very scalable or secure, this may be adequate for a simple PCPS.

For an embodiment that has several PAs 300 and MAs 302 spanning hundreds of servers across the Internet, PB 312 can be implemented as a distributed, NOSQL database for resolved payment messages, and an in-memory database cache for pending payment requests, and webhooks to send specific PAs or MAs of fine-grained events and data. FIG. 12 depicts a payment bus using webhooks. In this embodiment, the PB 312 comprises an Internet server 1200 that has an in-memory database 1202 for pending payment requests, and a distributed NOSQL database 1204 for resolved payment requests and payment transaction records. Merchant Agents and Payer Agents register specific webhooks—i.e., URLs that accept HTTP POST messages—for events that concern them. On the arrival of a payment message, server 1200 first stores the message, looks up what event the message triggers, and then sends a HTTP POST to the webhook registered for that event in the Webhook Directory 1206. While we have described two solutions, many other technologies can support an Internet-wide payment bus PB 312. REST hooks, Websockets, Pub-Sub, Server Sent etc. are some possibilities.

Address Space

An address space or namespace defines the context within which the identity of some entity is defined and where the entity is uniquely addressable. For example, a filesystem in a computer is an address space that uniquely qualifies each file within a hierarchical directory structure; the Domain Name Service (DNS) of the Internet defines a highly distributed and hierarchical address space, in which any domain, subdomain or a webpage is uniquely addressable. For smooth payment flow in a PCPS embodiment, it is necessary that a PCPS provide an address space in which payers and merchants can clearly identify each other by their public identities. In simple embodiments, the address space may be nothing more than a flat, PCPS-wide directory of payers and merchants, ensuring that their IDs are unique at the time of registration. If the embodiment has only one Payer Agent PA 300 and only one Merchant Agent MA 302, their respective identity managers PIM 322 and MIM 332 would also be the logical Payer Directory 316 and the logical Merchant Directory 318 respectively. If there are multiple payer agents and merchant agents, then the union of their respective PIMs and MIMs would constitute the logical payer and merchant directories with an additional check at the time of registration to ensure that payers or merchants do not have duplicate registrations across agents.

A hierarchically organized address space is more common and scalable. In the address space shown in FIG. 13, merchant agents and payer agents are trusted entities, and their identities are simply their IP addresses maintained by the payment bus in a routing table. The merchants are identified by domain names, which are by definition unique. A payer is assigned an email ID at registration where the email ID is part of the domain of the payer agent that registers the payer and is therefore unique. In this case, the naming convention used by domain names and email IDs constitute implicit merchant and payer directories PD 316 and MD 318.

Although a simple embodiment could just inform all agents whenever a new payment message arrives at PB 312 and let an agent determine if the message concerns that agent, that would be neither secure not efficient. Most embodiments maintain an association list specifying which payer or merchant is associated with which agent, though in an address space such as the hierarchical one shown in FIG. 13, no such list is necessary for payers since the structure of an email ID automatically specifies its agent association. Note that, strictly speaking, such association lists are a matter of efficiency and not an integral part of an address space per se.

In our invention, it is not just the payers and merchants who are uniquely identifiable, but also payment messages that they send to each other. Since all payment messages pass through the Payment Bus 312, in some embodiments, it is most efficient to assign an ID to payment messages when they are first reach the Payment Bus 312. In other embodiments, each merchant agent and payer agent may assign an ID that is unique within that agent's address space, and prefix it with that agent's own ID, so that the message's ID is unique across the PCPS.

Why have many PAs and MAs? Our invention aims to provide an open and federated infrastructure for payments and does not subsume any particular business model. We imagine that different agents will cater to different market niches, geographies or different class of payers and machines. For example, one merchant agent could cater to merchants of a certain type while another may cater to only payers in a certain geography. Similarly, one PA may cater to payers paying with prepaid credit, another to payers paying with PayPal, and another may specialize in discounts and coupons. This invention is agnostic about the underlying business model.

SOME EMBODIMENTS OF THE INVENTION

Embodiment E0: A Prototypical Payment Scenario at a Store

Assume that embodiment E0 is offered as a service at the fictitious domain e0.com. Assume that a payer, Angela, has signed up with e0.com, through one of E0's payer agents called elfpoint.com and is assigned an email ID angela@elfpoint.com. Assume that she has added two cards as her payment credentials to her profile. Let us also assume that a merchant, a small convenience store called Franks Store, has signed up with e0.com through one of its merchant agents MA 302. The Merchant Profile Manager MPM 334 will obtain the merchant's name, logo, bank account, and other information through a dialog similar to the one in FIG. 10.

Assume that Angela is at Franks Store's cash register to check out. The merchant logs into e0.com via a browser, uses the MA 302's browser interface 802 to create a payment request 1402 as shown in FIG. 14. 1404 is the JSON representation of the payment request. In other embodiments, the customer ID may be scanned from the customer's mobile device as a barcode or entered by the customer through a keypad device.

MA 302 now places the payment request PR in the E0's Payment Bus PB 312, which delivers it to Angela's payer agent PA 300. PA 300 consults Angela's profile and finds that her delivery preference is her mobile app, so the PR is delivered to her mobile app 404. The Payment Presenter PP 326 presents a payment request based on both merchant's and payer's respective profiles. PP 326 consults Payer Profile Manager PPM 324 to obtain the two cards stored by Angela in her profile; it also consults the Merchant Profile Manager MPM 334 to get Franks Store's logo. 1502 (FIG. 15) is the screenshot of the PR as presented to Angela.

To fulfill the payment request PR, Angela can choose a card from her profile or enter a new card. Her payment source and authorization are delivered by Angela's app 404 to PA 300. PA 300 sends the merchant ID and the payment source to a Payment Gateway 310 through its Payment Bridge PB 328. If the payment is successfully completed, PG 310 returns a payment confirmation and PA 300 creates a Payment Transaction Record PTR with a reference to the payment request ID and merchant ID, the transaction amount, and the confirmation code provided by PG 310. 1504 in FIG. 15 shows the PTR. PA 300 deposits the PTR in the Payment Bus PB 312 which PB 312 routes to Merchant Agent MA 302. Now MA 302 verifies that the payment amount in the PTR matches the amount billed in the PR and that PTR has a confirmation code. Satisfied, MA 302 changes the status of PR as from "active" to "paid."

FIG. 16A depicts the steps that E0 goes through in the above scenario. FIG. 16B provides an alternate depiction in terms of process flow: MA 302, PB 312 and PA 300 are shown left to right and the sequence of the process steps from top to bottom. FIG. 11 provides yet another view of the process and data flow as seen by MA 302, PB 312, and PA 300. Each arrow represents the direction of data flow or an action, and the steps are numbered. "APR⇒RPR" stands for the modification of the status field of a payment record from "active" to "paid."

Embodiment E1: Tipping a Street Performer

Imagine tipping a street performer, a waiter in a food kiosk, or making a charitable donation to a roadside volunteer. In such scenarios, there is no formal payment request, and the payee and the payer typically do not know each other's identity. Assume that embodiment E1 is offered as a service at the fictitious domain e1.com. Payees register with e1.com as merchants and are provided a URL and a corresponding QR code that identifies them. A payee is free to display the QR code in any location. For such payees, E1 creates a persistent payment request which has the payee's identity, but no payment amount.

When a payer—who may or may not be registered with a PA 300 of the E1—scans the QR code from a mobile device, the payer is directed to the webpage or app location specified by the QR code and unique to that payee. If the payer is registered and logged in, the Payment Presenter PP 326 will retrieve the payer's stored payment sources and the payee's profile; if the payer is unknown, then he or she is simply shown the merchant's page, and the payer can pay by entering a credit/debit card or with the device supported payment system such as Apple Pay or Google Pay. FIG. 17 depicts screenshots from E1 and shows the payment request from a street performer as it is shown to an unknown payer (1702) and a logged-in payer (1704).

How does Embodiment E1 work? Shown below is the JSON representation of the payment request PR created by E1's Payer Agent PA 300 for the street performer.
{"header": {
"request_id": 4014605071,
"merchant_id": "Street Comedian Joe",
"fulfillment_count": "unlimited"}
{"body": {"ack": "You made my day!"}
}
Notice that, besides the payee's identity, this payment request has very little. With no amount requested and no designated payer, this request can be captured by anyone. Note that the PR specifies that the "fulfillment_count" is 'unlimited'. This means that PR will stay persistent in PR 314 so that any number of payers can fulfill the same PR. However, each payment will create a new Payment Transaction Record PTR that references the same PR. For each new PTR, the MA 302 will simply credit the payee's account with the amount in the PTR but leave the status field of PR as 'active' because the "fulfillment_count" is 'unlimited.'

Although very simple, this scenario illustrates one of the advantages of this invention. The street performer is able to accept electronic payment from an unknown passerby without possessing or operating any payment infrastructure and without interrupting his performance. Being payer-centric, once the performer sets up the payment request, payments are initiated and orchestrated by the payer with no overhead for the payee. Note that there is nothing special about the QR code itself—it is simply an easier-to-read version of the payee's URL.

E0 and E1 Combined: An Infrastructure-Less, Payer-Centric Cash Register

Embodiment E0 illustrated how a merchant can create a payment request for a specific amount directed to a specific payer. Embodiment E1 illustrated a payer identifying a merchant by their ID to make a payment. A trivial combination of E0 and E1 can be used as a simple cash register where a merchant can create a payment request as in E0 but without knowing the payer's ID and a payer can scan the (static) QR code of the merchant to retrieve the merchant's most recent payment request. Scenario 1804 (FIG. 18) shows a vendor displaying a QR code on a sheet of paper that simply identifies the merchant as in E1. The merchant creates a payment request for a specific amount as in E0, but with no payer ID. When a payer scans the merchant's QR code—a static ID—the payer agent retrieves and displays the most recent payment request by that merchant (the typical scenario for a cash register), thereby using a static merchant ID as a proxy for a dynamic payment request. FIG. 19 depicts the process flow.

This is another example of how payer-centric payments are advantageous to both customers and merchants. In the scenario described, a small merchant is able to transmit a payment request for a specific amount and accept an electronic payment from an anonymous payer without needing any payment infrastructure; the customer is able to pay a fly-by-night street vendor electronically without revealing his or her identity or payment credentials.

Embodiment E2: Paying at a Restaurant, Tips Included

Embodiment E2 supports restaurant payments: a scenario in which the payment amount is known, the payer's identity may not be known, and the payer may modify the payment request by adding a tip. Assume that our restaurant has integrated its cash register with Merchant Agent MA 302 through the latter's API interface 806 so that when a check is rung up, the cash register automatically generates a payment request PR which is placed in E2's PB 312. Now the restaurant can print the check with a QR code that identifies the PR. In FIG. 20, 2002 shows the restaurant's MA 302; 2004 shows the printed check for our customer Angela.

To pay, Angela scans her check with her app 404 of E2 and her app 404 retrieves the PR from PB 312. PP 326 that serves her app 404 retrieves her stored cards from her profile; it also retrieves the restaurant's logo from Topaz Café's profile and notes that tips are applicable to its payment requests (see FIG. 10). Based on all this data, PP 326 generates a visual representation 2102 (FIG. 21) of the PR. When Angela adds a tip, chooses a card, and authorizes the payment, PA 300 completes the payment process depicted in FIG. 16A. PP 326 of Angela's PA 300 now confirms the payment, and—as instructed by the Topaz Café's profile (see FIG. 10)—prompts Angela to review the restaurant and accept coupons as shown in 2104.

This embodiment is an illustration of a much more flexible payment scenario where the customer does not just fulfill a payment request as given but modifies it by adding a tip from her own device. Note that Angela's identity and payment credentials were not shared with the restaurant, she did not have to wait for a waiter to swipe a card and bring her an invoice for her to add tips and the restaurant did not need any payment infrastructure such as card readers.

Embodiment E5: An Automated Ticket Kiosk

Imagine a bus company that operates buses between two cities. FIG. 22 shows the bus company's ticket vending kiosk which is just a poster at the bus station. When a customer scans the poster, E5 will vend individually verifiable tickets for a given trip. FIG. 25 shows a pictorial representation of the ticket vending process.

In FIG. 10, we showed how merchants can choose various parameters pertaining to their business, including the payment model. One of the payment models they can specify is "tickets for events". Our bus company, Pegasus, registers as a ticket vendor and creates a ticket template as a payment request for tickets with its Merchant Agent MA 302 and generates a poster with a QR code identifying the payment request. FIG. 22 shows the poster and 2302 of FIG. 23 shows the JSON representation of Pegasus's ticket template, which is a type of payment request that may be fulfilled multiple times and has additional semantics: in particular, 2302 specifies that a customer can buy multiple tickets up to a maximum of 6 per customer, up to a maximum of 62 tickets until 11:40 am on the specified day. Further, the bus company requests tickets be issued in PDF417 code—the code typically used for tickets and boarding passes—with a unique ID for each ticket. It also provides an image for a human identifiable stub.

To buy a ticket, a customer scans the QR code from the company's poster (2502). In response, the customer's Payer Agent PA 300 retrieves the payment request, recognizes that the request is a ticket template, verifies that the number of tickets that have been fulfilled thus far is less than the maximum specified (2504), and sends the payment request/ticket template to the Payment Presenter PP 326. 2304 of FIG. 23 shows PP 326's rendition of Pegasus' payment request. The customer can pay as described in earlier embodiments (2506). When the customer pays, PA 300 performs three actions: (a) it increments the number of tickets fulfilled, (b) it generates random serial numbers for the tickets (2510), creates a PTR (2508) and attaches the ticket numbers to the body of the PTR and sends it to the Payment Bus PB 312, and (c) passes the serial numbers to the Payment Presenter 326 which generates the tickets in the PDF417 format requested by the merchant (2512). See 2402 (FIG. 24) for a screenshot from E5 where the payer is provided two tickets in both human-readable and PDF417 format with unique serial numbers. If the number of sold tickets has not reached the specified maximum in the payment request, E5 retains the payment request in Payment Repository PR 314 so E5 can continue to vend more tickets.

How can Pegasus validate the tickets? Since the ticket numbers were attached to the body of the corresponding PTRs (2510), Pegasus has access to the ticket numbers. 2404 (FIG. 24) is a screenshot of Pegasus' ticket validation app. When a customer presents a ticket, this app scans the ticket (2514) for its serial number; it then looks for an associated PTR that has the said serial number in its body (2516); if so, the ticket is verified to be genuine (2518).

One skilled in the art can easily see how E5 can be extended to provide more sophisticated tickets and ticket vending models. Since customers' display screens are generated through table-driven customizations such as the Merchant Profile (FIG. 10), the ticket template 2304 (FIG. 23) and customizable architectures for the Payment Presenter 326 (FIG. 07), it is straightforward to add other customizations and presentation options to tickets such as language translation, multiple classes of tickets, seat selection, cancellation, rebooking etc. The fact that the merchant profile, the ticket template as well as the payment presenter architecture are all customizable means that, in a given embodiment, ticket generation from templates can be performed by the merchant agent, the payer agent, or by collaboration between the two, depending on the underlying philosophy of the embodiment.

Embodiment E5 reflects just one philosophy for the design of a ticket vending system, wherein the ticket template acts as a single collective payment request from the merchant, and ticket generation may be seen as self-service ticket issuing by payers through payer agents PA 300. It is equally possible for the ticket template to be treated as a directive by the merchant to the Merchant Agent MA 302 to create individual payment requests for each ticket and handle the payment just like the one described in Embodiment E0. This can be accomplished by including an API-endpoint in the ticket template through which the Payer Agent PA 300 can interface with the Merchant Agent 302 whenever the ticket template is accessed by the payer. This will result in MA 302 being invoked via the API-endpoint and MA 302 can display a payment request via the API endpoint and the Payment Presenter 326. Both philosophies are fully supported and enabled through the customizable Merchant Profile (FIG. 10), ticket template 2304 (FIG. 23) and Payment Presenter PP 326 (see 704 of FIG. 07).

Embodiment E5 underscores several advantages of our invention. First, by co-opting customers' devices for payment, the merchant has completely eliminated the need for a ticket vending infrastructure. Second, the merchant now has an elastic ticketing infrastructure whose capacity expands to accommodate as many payers as those who want to purchase tickets, so there isn't a last-minute rush at one or two ticket vending machines or ticket counters. Third, payers did not have to visit yet another website and share payment information with the merchant, but simply go to their payment app which not only vends the ticket, but also stores the ticket and receipt with the payer's account rather than send them to the payer via another channel like email. Finally, this scenario also indicates that our invention can cater not just to a payment transaction but can invoke follow-up actions triggered by the completion of a payment.

Glossary

| | |
|---|---|
| Active payment request | A payment request whose status is "active." Same as pending payment request. |
| API | Application Programming Interface. APIs enable computer programs to interact and exchange data with each other. |
| API endpoint | A named or addressable API that has a specific purpose. |
| Customer | Same as payer. |
| HTTP POST | One of the methods of the HTTP protocol used to submit data to a web server. |
| JSON | JavaScript Object Notation: A data interchange standard from European Computer Manufacturer's Association (ECMA). The standard is also known as ECMA-404. |
| Merchant | Same as payee. |
| Payee | Same as merchant, vendor. |
| Payer | Same as customer. |
| Payment credential | A credit card number, bank account number etc. along with information such as expiration date, a CVC code or any other data needed to authorize a payment using that payment source. |
| Payment message | Same as payment record. |
| Payment request | Abbreviated PR, a request for a payment, typically sent by a merchant to a payer. |
| Payment Transaction Record | Abbreviated PTR, a record typically created by a payer or payer agent to confirm a payment in response to a payment request. |
| PCPS or PCPS embodiment | Refers to embodiments of this invention and stands for Payer-Centric Payment System. |
| Payment Gateway | A third-party service that clears card and back transactions with financial institutions, transfers money, and confirms a transaction. |
| PR | Without any other qualification, PR stands for payment request. References to Payment Repository are always qualified as PR 314. |
| PR 314 | Payment Repository 314. |
| PTR | Same as Payment Transaction Record. |
| QR code | Quick Response code, also called 2-dimensional bar code. QR codes can be used to transmit up to 4K of data visually. |
| Resolved payment request | A payment request that is no longer active either because it has been paid, withdrawn, past its expiry date or any other reason. |
| Ticketing Template | A type of persistent payment request that may be instantiated multiple times as in ticket vending. See E5. |
| Vendor | Same as merchant. |
| Webhook | A website URL that accepts a POST request in the HTTP or HTTPS protocol. Webhooks are typically used to inform a webserver of an event and/or pass data to a webserver. |

The invention claimed is:

1. A payment routing system that enables a merchant to accept payer-centric electronic payment from a customer's mobile device, the system comprising:
a server connected to a computer network having stored thereon computer program instructions configured to implement a merchant directory, wherein the merchant directory is configured to provide each merchant listed in the merchant directory with a unique identifier (merchant ID) for unambiguous identification within the payment routing system, the merchant directory comprising:
a list of merchant records, wherein a merchant record comprises at least the merchant's merchant ID, the merchant's authentication credentials for accessing the payment system, and the identity of a financial account for receiving funds from payments made by customers to the merchant; and
identification generation logic configured to assign a distinctive identifier based on predetermined criteria to each merchant listed in the directory;
a server connected to the computer network having stored thereon computer program instructions configured to implement a payment record repository, wherein the payment record repository is configured to provide each payment record stored in the payment record repository with a unique identifier (payment record ID) for unambiguous identification within the payment routing system, wherein a payment record comprises:
- a payment request created by a merchant listed in the merchant directory to request payment from a customer for a transaction between the merchant and the customer and includes the merchant's merchant ID as payee of the payment request; or
- a payment transaction record created by a customer in response to payment of a payment request, wherein the payment transaction record comprises:
  - a payment record ID of the payment request; and
  - a confirmation statement received from an online payment gateway, wherein the confirmation statement confirms that the online payment gateway has successfully remitted, on behalf of the customer, a payment to a merchant whose merchant ID is specified as payee of the payment request; and an online payment bus implemented using one or more servers connected to the computer network and non-transitory computer-readable media storing program instructions which when executed by a processor cause the processor to perform a message routing method comprising:
- upon receiving a payment request from a merchant via a network connection authenticated with the merchant's authentication credentials as provided by the merchant directory:
  - storing the payment request in the payment record repository; and
- upon receiving a payment transaction record from a customer's mobile device:
  - storing the payment transaction record in the payment record repository; and
  - sending the payment transaction record to a merchant, via a network connection authenticated with the merchant's credentials as provided by the merchant directory, whose merchant ID is specified as payee of the payment request referred to in the payment transaction record.

2. The payment routing system of claim 1 further comprises a computing device operated by a merchant (cash register), connected to the online payment bus via a network connection authenticated with the merchant's authentication credentials as provided by the merchant directory, the cash register configured to execute:
- a ring-up method comprising:
  - creating a payment request for a financial and/or commercial transaction, wherein the payment request specifies a payment amount and designates the merchant ID of the merchant as payee of the payment request;
  - sending the payment request to the online payment bus; and
  - enabling the customer's mobile device to acquire from the merchant, via a peer-to-peer data exchange modality, the merchant's merchant ID and/or the payment request's payment record ID; and
- a payment reconciliation method comprising:
  - receiving a payment transaction record from the payment bus; and
  - modifying the payment request to indicate that the payment request has been paid if the confirmation statement enclosed in the payment transaction record indicates that the online payment gateway has remitted a payment amount equal to or greater than the payment amount requested by the payment request referred to in the payment transaction record.

3. The payment routing system of claim 2, wherein the payment request created by the cash register's ring-up method further designates the customer's email ID and/or phone number as a payer of the payment request, and wherein the message routing method of the online payment bus further comprises: sending the payment request to the email ID and/or the phone number.

4. The payment routing system of claim 2, wherein the peer-to-peer data exchange modality includes the use of barcodes, Quick Response (QR) codes, or wireless technology.

5. The payment routing system of claim 2, wherein the cash register initiates execution of a predetermined action upon the payment of some payment requests.

6. The payment routing system of claim 2 further comprises a customer payment application rendered on the customer's mobile device, wherein the customer payment application is configured to execute a payment method comprising:
- acquiring, via a peer-to-peer data exchange modality from the cash register, the merchant's merchant ID and/or the payment request's payment record ID;
- retrieving a payment request via the online payment bus, based, at least in part, on the merchant ID and/or the payment record ID;
- displaying the payment request on the customer's mobile device;
- obtaining the customer's approval to make a payment to the payment request using a customer-specified payment credential;
- sending a payment message to an online payment gateway configured to cause the online payment gateway to make a payment to the payee of the payment request using the customer-specified payment credential;
- receiving, from the online payment gateway, a confirmation statement that confirms that the online payment gateway has successfully remitted, on behalf of the customer, a payment to a merchant whose merchant ID is specified as payee of the payment request;
- creating a payment transaction record comprising the payment record ID of the payment request and the confirmation statement received from the online payment gateway; and
- sending the payment transaction record to the online payment bus.

7. The payment routing system of claim 6, wherein the payment request displayed on the customer's mobile device includes a field for the customer to enter a tip amount.

8. The payment routing system of claim 1, wherein the message routing method of the online payment bus further comprises: upon receiving a retrieval request for a payment request in the payment record repository, wherein the retrieval request specifies a merchant ID:
- retrieving a most recent payment request in the payment record repository that specifies the merchant ID as payee; and
- sending the retrieved payment request to the sender of the retrieval request.

9. The payment routing system of claim 1, wherein the payment request and/or the payment transaction record contains a field for merchants and customers to share information with each other.

10. The payment routing system of claim 1, wherein the merchant comprises an entity selected from a group consisting of an individual, a physical store, an online store, a vending machine, a kiosk, an institution, and any type of commercial organization.

11. The payment routing system of claim 1, wherein the merchant is represented by a computer-implemented merchant agent that performs actions on behalf of the merchant, and the customer is represented by a computer-implemented customer agent that performs actions on behalf of the customer.

12. The payment routing system of claim 11, wherein the merchant includes any designated agent of the merchant, and the payer includes any designated agent of the payer.

13. The payment routing system of claim 1 further comprises a customer payment application rendered on the customer's mobile device, wherein the customer payment application is configured to execute a payment method comprising:

retrieving a payment request via the online payment bus, based, at least in part, on a merchant ID and/or a payment record ID;

displaying the payment request on the customer's mobile device;

obtaining the customer's approval to make a payment to the payment request using a customer-specified payment credential;

sending a payment message to an online payment gateway configured to cause the online payment gateway to make a payment to the payee of the payment request using the customer-specified payment credential;

receiving, from the online payment gateway, a confirmation statement that confirms that the online payment gateway has successfully remitted, on behalf of the customer, a payment to a merchant whose merchant ID is specified as payee of the payment request;

creating a payment transaction record comprising the payment record ID of the payment request and the confirmation statement received from the online payment gateway; and sending the payment transaction record to the online payment bus.

14. The payment routing system of claim 13, wherein the payment request displayed on the customer's mobile device includes a field for the customer to enter a tip amount.

* * * * *

UNITED STATES PATENT AND TRADEMARK OFFICE
CERTIFICATE OF CORRECTION

| | | |
|---|---|---|
| PATENT NO. | : 12,002,023 B2 | Page 1 of 1 |
| APPLICATION NO. | : 18/115107 | |
| DATED | : June 4, 2024 | |
| INVENTOR(S) | : Kishore Swaminathan | |

It is certified that error appears in the above-identified patent and that said Letters Patent is hereby corrected as shown below:

In the Claims

In Claim 1, Under Column no. 17, Line no. 13, Replace:
"a payment record ID of the payment request;"
With:
--a reference to the payment request based, at least in part, on the payment record ID of the payment request;--

Signed and Sealed this
Ninth Day of July, 2024

Katherine Kelly Vidal
*Director of the United States Patent and Trademark Office*